United States Patent
Markovic et al.

(10) Patent No.: US 11,960,628 B2
(45) Date of Patent: Apr. 16, 2024

(54) METHOD AND SYSTEM FOR PROPAGATING DATA BETWEEN DIFFERENT DOMAINS IN A PRIVACY FOCUSED WAY

(71) Applicant: IDENTITYRENT PTY LTD, Wollstonecraft (AU)

(72) Inventors: Marko Markovic, Wollstonecraft (AU); Wayne Schwebel, Wollstonecraft (AU)

(73) Assignee: IDENTITYRENT PTY LTD, Wollstonecraft (AU)

(*) Notice: Subject to any disclaimer, the term of this patent is extended or adjusted under 35 U.S.C. 154(b) by 0 days.

(21) Appl. No.: 18/069,286

(22) Filed: Dec. 21, 2022

(65) Prior Publication Data

US 2023/0120879 A1    Apr. 20, 2023

Related U.S. Application Data

(63) Continuation-in-part of application No. 17/753,335, filed as application No. PCT/AU2021/050706 on Jun. 30, 2021, now Pat. No. 11,575,761.

(30) Foreign Application Priority Data

Jul. 1, 2020   (AU) ................................ 2020902230
Oct. 9, 2020   (AU) ................................ 2020903656

(51) Int. Cl.
*G06F 21/62*    (2013.01)
*H04L 67/02*    (2022.01)
(Continued)

(52) U.S. Cl.
CPC .......... *G06F 21/6263* (2013.01); *H04L 67/02* (2013.01); *H04L 67/146* (2013.01); *H04L 67/535* (2022.05)

(58) Field of Classification Search
None
See application file for complete search history.

(56) References Cited

U.S. PATENT DOCUMENTS 8,266,276 B1 *   9/2012   Vasudeva ................ H04L 43/12
                                                                    709/224
8,898,309 B2 *  11/2014   Goldspink .............. H04L 67/02
                                                                    709/227
(Continued)

FOREIGN PATENT DOCUMENTS

WO   2010096211 A1   8/2010
WO   2018002584 A1   1/2018

OTHER PUBLICATIONS

Reza-E Rabbi; International Search Report and Written Opinion; International Application No. PCT/AU2021/050706; dated Sep. 6, 2021; Australian Patent Office; Woden, ACT, Australia.

(Continued)

*Primary Examiner* — Lashonda Jacobs-Burton
(74) *Attorney, Agent, or Firm* — Stevens & Showalter LLP

(57) ABSTRACT

A propagation server for facilitating propagation of recorded information between first-party data structures associated with different domains, the propagation server arranged for data communication via a network with web browsers of client devices, wherein the propagation server is associated with a propagation domain being a web domain, wherein the propagation server is configured to: receive a first request from a first web browser, said first web browser associated with a first client device, wherein the first request identifies a first domain being a web domain different to the propagation domain; determine, via data communication with the first web browser, whether a propagation data structure, being a first party data structure associated with the propagation domain, is present on the first web browser; in a case (Continued)

where the propagation data structure is present: determine an identifier from information stored with the propagation data structure; generate first propagation information in dependence on the identifier, said first propagation information enabling determination of the identifier by the propagation server in a subsequent data communication instance between the first web browser and the propagation server, wherein said subsequent data communication instance is identified as being associated with the first domain; and communicate the first propagation information to the first web browser.

21 Claims, 19 Drawing Sheets

(51) Int. Cl.
    *H04L 67/146*     (2022.01)
    *H04L 67/50*     (2022.01)

(56) References Cited

U.S. PATENT DOCUMENTS

| | | | | |
|---|---|---|---|---|
| 8,990,330 | B2* | 3/2015 | Neal | H04N 21/812 |
| | | | | 709/200 |
| 9,344,505 | B1* | 5/2016 | Martin | H04L 45/745 |
| 10,291,722 | B1 | 5/2019 | Mendez | |
| 2004/0267691 | A1* | 12/2004 | Vasudeva | G06F 11/3409 |
| 2009/0083860 | A1 | 3/2009 | Nathan et al. | |
| 2010/0095219 | A1* | 4/2010 | Stachowiak | G06F 16/9562 |
| | | | | 715/745 |
| 2014/0244387 | A1* | 8/2014 | Patton | G06Q 30/0269 |
| | | | | 705/14.53 |
| 2015/0052217 | A1* | 2/2015 | Benguerah | G06Q 30/0251 |
| | | | | 709/217 |
| 2015/0081778 | A1 | 3/2015 | Zhang et al. | |
| 2015/0248499 | A1* | 9/2015 | Gnech | G06F 16/84 |
| | | | | 707/610 |
| 2016/0261699 | A1* | 9/2016 | Martin | H04L 41/0246 |
| 2017/0134512 | A1* | 5/2017 | Wyatt | H04L 67/75 |
| 2017/0243014 | A1* | 8/2017 | Gopalakrishnan | G06F 21/606 |
| 2022/0321669 | A1 | 10/2022 | Markovic et al. | |

OTHER PUBLICATIONS

Reza-E Rabbi; International Preliminary Report on Patentability; International Application No. PCT/AU2021/050706; dated Dec. 9, 2021; Australian Patent Office; Woden, ACT, Australia.

HTTP Cookie; Wikipedia; retrieved from the internet at https://en.wikipedia.org/wiki/HTTP_cookie on Feb. 25, 2022.

Dieter Bohn; "Google to 'phase out' third party cookies in Chrome, but not for two years"; The Verge; Jan. 14, 2020; retrieved from https://www.theverge.com/2020/1/14/21064698/google-third-party-cookies-chrome-two-years-privacy-safari-firefox on Feb. 25, 2022.

Lashonda T. Jacobs-Burton; Notice of Allowance; U.S. Appl. No. 17/753,335; dated Sep. 28, 2022; United States Patent and Trademark Office; Alexandria, Virginia.

* cited by examiner

METHOD AND SYSTEM FOR PROPAGATING DATA BETWEEN DIFFERENT DOMAINS IN A PRIVACY FOCUSED WAY

FIELD OF THE INVENTION

The invention generally relates to methods for utilising first-party cookies in place of third-party cookies.

BACKGROUND TO THE INVENTION

Web browsing has developed from simple hyper-text linking between static web pages to a dynamic interconnection of many static and dynamically generated websites providing extensive content.

As browsing developed, a need to be able to record information associated with websites was addressed by enabling websites to set "cookies"—small pieces of data stored on a computer running a web browser in response to an instruction made by a website being accessed by the web browser.

A cookie can be a "first-party cookie" or a "third-party cookie". The former are set by the particular domain being accessed by the web browser. For example, a user may direct the web browser to www.example.com, and the web content accessed at this domain by the web browser may instruct recording of a cookie containing data and associated with the same domain (hence the term "first-party"). The latter are set by a different domain to that being accessed by the web browser. For example, the web page being accessed at www.example.com may itself utilise resources of another domain, for example, www.addomain.com. This resource may itself set a cookie—however, as it is associated with a different domain, the cookie is associated with the second domain. Hence, the cookie is a third-party cookie; it is associated with a different party to that of the domain being accessed by the web browser.

There has been a trend of preferring to not allow setting of third-party cookies—for example, as a user is not necessarily aware of the second domain, setting of a third-party cookie may be considered undesirable. However, third-party cookies play an important role in modern online activities, providing means to track activity among different websites (for example, for providing targeted advertising) and to allow for more efficient user identification. For example, a common owner of several websites (each associated with a different domain) may have legitimate interests in identifying a user when that user visits its unique websites; the removal of third-party cookies, although for the positive reason of improving user privacy and security, is likely to have negative consequences in these circumstances.

As an example, when user (via a web browser) accesses a known domain, such as www.example.com, it may generate at least some of the content for the user by utilising resources from a third-party domain, for example www.addomain.com. In the past, www.addomain.com may set a third-party cookie (for example, with name=AdDomainId and value=12345). In terms of a browser functionality, this cookie is related to www.addomain.com rather than www.example.com. When a user further navigates to www.example1.com, a domain totally unrelated to www.example.com and owned by another company, that which also utilises resources of www.addomain.com, in the past the browser would automatically send the cookie for www.addomain.com to www.addomain.com. This means that a cookie that was previously set on www.example.com (name=AdDomainId with value=12345) is automatically sent from www.example1.com.

Therefore, recently, several major web browser developers have announced plans to disable third-party cookies by default. Such an action is predicted to have an adverse consequence on legitimate online activity.

It would be desirable to provide a mechanism for enabling functionality provided by third-party cookies without requiring setting of third-party cookies.

SUMMARY OF THE INVENTION

Embodiments described herein are generally directed towards providing mechanisms for enabling functionality provided by third-party cookies without requiring the setting of third-party cookies. For example, certain described embodiments may be suitable for providing functionality to enable tracking of particular users amongst several different websites associated with different domains, which may advantageously enable identification of a user by said different websites in a manner invisible to said user. Advantageously, identification of a user may allow the different websites to offer suitably tailored content based on the user identification, thereby providing an improved user experience across the various websites and domains. These and other advantages are generally achieved without setting third-party cookies, which previously have been utilised to provide such function. In order to strike a balance between legitimate tracking activities and the desire for user privacy and security, certain described embodiments provide for additional limitations on the extent to which user identifying information is made available.

An embodiment provides a propagation server for facilitating propagation of recorded information between first-party data structures associated with different domains, the propagation server arranged for data communication via a network with web browsers of client devices, wherein the propagation server is associated with a propagation domain being a web domain, wherein the propagation server is configured to: receive a first request from a first web browser, said first web browser associated with a first client device, wherein the first request identifies a first domain being a web domain different to the propagation domain; determine, via data communication with the first web browser, whether a propagation data structure, being a first party data structure associated with the propagation domain, is present on the first web browser; in a case where the propagation data structure is present: determine an identifier from information stored with the propagation data structure; generate first propagation information in dependence on the identifier, said first propagation information enabling determination of the identifier by the propagation server in a subsequent data communication instance between the first web browser and the propagation server, wherein said subsequent data communication instance is identified as being associated with the first domain; and communicate the first propagation information to the first web browser.

In an embodiment, the propagation server is configured to: in a case where the propagation data structure is not present: generate an identifier; generate the first propagation information in dependence on the generated identifier, said first propagation information enabling determination of the generated identifier by the propagation server in a subsequent data communication instance between the first web browser and the propagation server, wherein said subsequent data communication instance is identified as being associated with the first domain; and communicate the first propagation information to the first web browser. The propagation server may be configured to: in response to determining that a propagation data structure is not present, cause a presentation of a user control interface on the first web browser enabling a user of the first web browser to define one or more propagation rules for storing in a propagation rules data structure on the first web browser, wherein the one or more propagation rules are not accessible to data communications from domains different to the propagation domain, and wherein the propagation information is generated in dependence on the defined one or more propagation rules.

In an embodiment, the propagation server is configured to: receive a propagation rules edit request from the first web browser; in response, cause a presentation of a configuration interface on the first web browser enabling a user of the first web browser to define and/or modify one or more propagation rules for storing in a propagation rules data structure on the first web browser, wherein the one or more propagation rules are not accessible to data communications from domains different to the propagation domain, and wherein the propagation information is generated in dependence on the defined one or more propagation rules.

In an embodiment, the propagation information is also generated in dependence on one or more propagation rules associated with the propagation data structure. The one or more propagation rules may define at least two groups of one or more domains. In this case, each group may comprise different domains to the other groups, such that the propagation information generated in dependence on a particular identifier is the same for domains of a group and different for domains of different groups. The propagation server may be interfaced with a match module arranged for data communication via the network, the match module configured to: receive a first request associated with a first group of the at least two groups, wherein the request identifies one or more first identifiers and specifies at least one second group of the at least two groups, the at least one second group being different to the first group; obtain second propagation information associated with one or more web browsers from the second group, and convert the second propagation information into one or more second identifiers, each associated with one of the one or more web browsers; identify, for each of the one or more first identifiers, a match state indicative of the presence or non-presence of an identical second identifier; and communicating a response to the first group indicating the match state for each of the one or more first identifiers. The match module may be implemented by the propagation server. The first request may provide first propagation information associated with one or more web browsers and the match module may convert said first propagation information into the one or more first identifiers, thereby identifying the one or more first identifiers. The match module may maintain a record of match rules for a plurality of identifiers, and the identified match state for at least one first identifier may be dependent on an allowability rule defined the match rule for that at least one identifier.

In an embodiment, the propagation server encrypts the identifier to thereby generate an encrypted identifier for storing with the propagation data structure, and decrypts the encrypted identifier when determining the identifier.

In an embodiment, the propagation server maintains a database of propagation keys, each propagation key associated with one or more domains, and generation of the propagation information comprises encrypting the identifier utilising a first propagation key being associated with the first domain.

An embodiment provides a network system is provided comprising the propagation server. The network system of this embodiment further comprises one or more domain servers, each arranged for data communication via a network with the web browsers of the client devices and each associated with a unique domain, wherein the propagation domain is different to the domains of the domain servers, and wherein each domain server is configured to: receive a communication from a web browser; determine whether a first domain data structure is associated the communication, the first domain data structure associated with the domain of the domain server; in response to determining that there is not a first data structure present, obtain from the web browser propagation information, the propagation information having been obtained by the web browser due to the first request communicated to the propagation server; generate first domain data structure information based on the received propagation information instruct the web browser to record in a new first domain data structure the first domain data structure information.

In an embodiment, the first domain data structure information by encrypting the propagation information utilising a first domain key known to the domain server, the first domain key not utilised in generating the propagation information from the identifier. The propagation server may encrypt the identifier to thereby generate an encrypted identifier for storing with the propagation data structure. The propagation server may decrypt the encrypted identifier when determining the identifier. Each domain server may be configured to generated associated domain data structure information by encrypting received propagation information utilising a domain key known to the particular domain server. Each domain server may be configured to: receive the propagation information from the web browser after the web browser is instructed to communicate with the propagation server, said propagation information provided to the web browser due to its communication with the propagation server.

An embodiment provides a propagation server for facilitating propagation of recorded information between first-party data structures associated with different domains, the propagation server arranged for data communication via a network with web browsers of client devices, wherein the propagation server is associated with a propagation domain being a web domain, wherein the propagation server is configured to: receive a first request from a first web browser, said first web browser associated with a first client device, wherein the first request identifies a first domain being a web domain different to the propagation domain; determine, via data communication with the first web browser, whether a propagation data structure, being a first party data structure associated with the propagation domain, is present on the first web browser; in a case where the propagation data structure is not present: generate an identifier; generate the first propagation information in dependence on the generated identifier, said first propagation information enabling determination of the generated identifier by the propagation server in a subsequent data communication instance between the first web browser and the propagation server, wherein said subsequent data communication instance is identified as being associated with the first domain; and communicate the first propagation information to the first web browser.

In an embodiment, the propagation data structure comprises a propagation cookie in which at least the information for determining the identifier is stored.

An embodiment provides a method for facilitating propagation of recorded information between first-party data structures associated with different domains, the method comprising: at a propagation server arranged for data communication via a network with web browsers of client devices, wherein the propagation server is associated with a propagation domain being a web domain: receiving a first request from a first web browser, said first web browser associated with a first client device, wherein the first request identifies a first domain being a web domain different to the propagation domain; determining, via data communication with the first web browser, that a propagation data structure is present, being a first party data structure associated with the propagation domain, is present on the first web browser; in response, determining an identifier from information stored with the propagation data structure; generating first propagation information in dependence on the identifier, said first propagation information enabling determination of the identifier by the propagation server in a subsequent data communication instance between the first web browser and the propagation server, wherein said subsequent data communication instance is identified as being associated with the first domain; and communicating the first propagation information to the first web browser.

An embodiment provides a method for facilitating propagation of recorded information between first-party data structures associated with different domains, the system comprising: at a propagation server arranged for data communication via a network with web browsers of client devices, wherein the propagation server is associated with a propagation domain being a web domain: receiving a first request from a first web browser, said first web browser associated with a first client device, wherein the first request identifies a first domain being a web domain different to the propagation domain; determining, via data communication with the first web browser, that a propagation data structure, being a first party data structure associated with the propagation domain, is present on the first web browser, is not present; in response, generating an identifier; generating the first propagation information in dependence on the generated identifier, said first propagation information enabling determination of the generated identifier by the propagation server in a subsequent data communication instance between the first web browser and the propagation server, wherein said subsequent data communication instance is identified as being associated with the first domain; and communicating the first propagation information to the first web browser.

An embodiment provides a method for recording information within first-party cookies on a web browser, for example wherein the web browser does not allow access to third-party cookies, including propagating recorded information from a second cookie associated with a second domain to a first cookie associated with a first domain, wherein the first cookie and the second cookie are each first-party cookies, such that a first web resource of the first domain and a second web resource of the second domain each have access to the recorded information via its associated first-party cookie.

The recorded information may be propagated to the first cookie during a current communication instance between the web browser and the first web resource of the first domain. The recorded information may be propagated to the first cookie in dependence on a determination of the absence of the first cookie.

The recorded information may be propagated via an intermediary, the intermediary being propagation information accessible to the web browser during the current communication instance.

According to an embodiment, the method comprises instructing the web browser, during the current communication instance, to communicate to a propagation server associated with a propagation domain different to the first domain, and receiving from the propagation server the propagation information such that the web browser is enabled to record as a first cookie the recorded information. The web browser may initiate the current communication instance via a communication to a first web server requesting content for display, the first web server associated with a first domain server and both said servers may be associated with the first domain, and the instruction to the propagation server may be received from the first domain server. The first web server may provide the content for display to the web browser in dependence on the recorded information after propagation of the recorded information from the second cookie to the first cookie. As part of the instruction, the web browser may provide information stored in a propagation cookie to the propagation server, and the propagation information may be based on the information stored in a propagation cookie. The information stored in a propagation cookie and the propagation information may be the same or the propagation information may be an encoded representation of the information stored in a propagation cookie. The propagation information may be generated according to propagation rules available to the propagation server, the propagation rules may be applied to the information stored in a propagation cookie. The propagation rules may be stored within the propagation cookie and provided to the propagation server as part of the instruction. The propagation information may be provided to the web browser in association with an instruction received from the propagation server, such that the web browser may be caused to communicate with the first domain server and provide the propagation information with the instruction. The web browser may receive an instruction from the first domain server, in response to providing the propagation information to the first domain server, to set the first cookie comprising the recorded information.

According to an embodiment, the intermediary is stored as web page specific data, and comprising: instructing the web browser to communicate with a first domain server, the web browser providing the web page specific data to the first domain server with the instruction; and receiving from the first domain server an instruction to set the first cookie with the recorded information, wherein the recorded information is equal to or derived from the web page specific data, wherein the instruction is received from a first web server in response to a request for content for display made by the web browser, wherein the first web server is associated with the first domain server, and wherein both said servers are associated with the first domain. The web page specific data may be set during a previous communication instance with the second domain server of the second domain. The web page specific data may not be accessible to executable code when run on the web browser and may be accessible to a first domain server when set by a communication with the second domain, and preferably is only accessible by an external server. The web page specific data may be stored in an ETag associated with a web page provided to the web browser before the instruction is sent to the web browser.

The first domain and second domain may be determined to be related domains for which propagation is allowed before allowing propagation for the recorded information from the second cookie to the first cookie.

The web browser may not allow access to third-party cookies.

An embodiment provides a domain server configured for communication with web browsers for facilitating propagation of recorded information between first-party cookies associated with different domains, the domain server configured to: receive a communication from a web browser due to a redirection instruction provided to the web browser from a first web server associated with the first domain; and determine whether a first cookie is present with the communication, the first cookie associated with the first domain, and wherein, in response to determining that there is not a first cookie present, the domain server is configured to: obtain from the web browser propagation information, the propagation information derived from recorded information of a second cookie associated with a second domain, wherein the recorded information is derivable from the propagation information; determine the recorded information from the propagation information; and instruct the web browser to record in a first cookie the recorded information.

The domain server may be configured to instruct the web browser to communicate with the first web server to enable generation of content for the web browser utilising the recoded first cookie.

In an embodiment, the domain server is further configured to, when obtaining the intermediary information: instruct the web browser to communicate with a propagation server associated with a propagation domain different to the first domain, wherein the propagation information is provided to the web browser from the propagation server in response to the instruction; and receive the propagation information from the web browser after the web browser is instructed to communicate again with the domain server. The propagation information may be generated according to propagation rules available to the propagation server, and the propagation rules may be applied to the information stored in a propagation cookie. The propagation rules may be stored within a propagation cookie stored in the web browser.

In an embodiment, the intermediary is stored as web page specific data, and wherein the domain server is further configured to: identify the web page specific data from the communication from the web browser; and communicate an instruction to set the first cookie with the recorded information, wherein the recorded information is equal to or derived from the web page specific data. The web page specific data may be set during a previous communication instance with a second domain server of a second domain. The web page specific data may not be accessible to executable code when run on the web browser and may be accessible to the first domain server when set by a communication with the second domain, and preferably is only accessible by an external server. The web page specific data may be stored in an ETag associated with a web page provided to the web browser before the instruction is communicated. The recorded information may be only propagated from the second cookie to the first cookie when the second domain is identified as being related to the first domain.

The web browser in communication with the domain server may not allow access to third-party cookies.

An embodiment provides a network system for facilitating propagation of recorded information between first-party cookies associated with different domains on a web browser in communication with the network system, the system comprising: one or more domain servers, wherein each domain server is configured to: receive a communication from a web browser due to a redirection instruction provided to the web browser from a web server associated with the domain; determine whether a first cookie is present with the communication, the first cookie associated with the domain; in response to determining that there is not a first cookie present, obtain from the web browser propagation information, the propagation information derived from recorded information of a second cookie associated with second domain, the second domain associated with another of the domain servers, wherein the recorded information is derivable from the propagation information; determine the recorded information from the propagation information; and instruct the web browser to record in a first cookie the recorded information.

Optionally, the network system comprises a propagation server associated with a propagation domain different to the first domain, and wherein each domain server is further configured to, when obtaining the intermediary information: instruct the web browser to communicate with the propagation server associated with a propagation domain different to the first domain; and receive the propagation information from the web browser after the web browser is instructed to communicate again with the domain server by the propagation server, and wherein the propagation server is configured to: determine the propagation information based on information provided from the web browser with the instruction. The information may comprise, if present, that stored in a propagation cookie readable by the propagation server. The propagation server may be configured to generate the propagation information according to propagation rules available to the propagation server, and the propagation rules may be applied to the information stored in a propagation cookie. The propagation rules may be stored within a propagation cookie stored in the web browser and may therefore be received by the propagation server via the communication from the web browser. In a case where a propagation cookie is not present, the propagation server may be configured to determine a value for a propagation cookie and to communicate an instruction to the web browser to set the value as a propagation cookie, and the propagation information may be generated in accordance with the newly determined value.

Optionally, each domain server is further configured to: identify web page specific data from the communication from the web browser; and communicate an instruction to set the first cookie with the recorded information to the web browser, wherein the recorded information is equal to or derived from the web page specific data. The web page specific data may be set during a previous communication instance with the second domain server.

The recorded information may be only propagated from the second cookie to the first cookie when the second domain is identified as being related to the first domain.

The network system may further comprise a web server for each domain server, the web server may be configured to instruct a web browser to communicate with its associated domain server, and each web server may share a domain with its associated domain server.

A web browser in communication with the system may be assumed to or may not allow access to third-party cookies.

As used herein, the word "comprise" or variations such as "comprises" or "comprising" is used in an inclusive sense, i.e. to specify the presence of the stated features but not to preclude the presence or addition of further features in various embodiments of the invention.

BRIEF DESCRIPTION OF THE DRAWINGS

In order that the invention may be more clearly understood, embodiments will now be described, by way of example, with reference to the accompanying drawings, in which.

DESCRIPTION OF EMBODIMENTS

Figure 1:
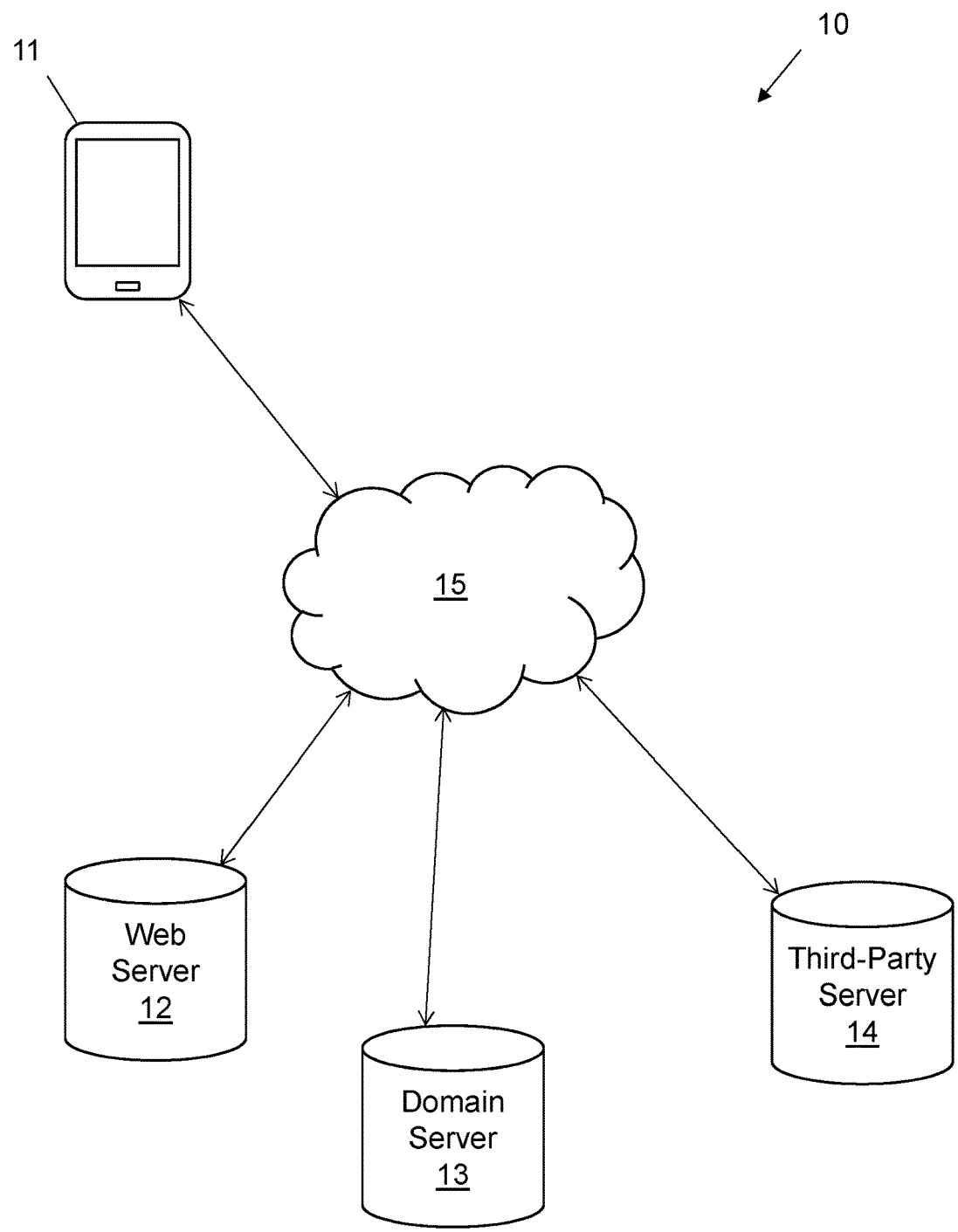
FIG. 1 shows a communication system according to an embodiment.

FIG. 1 shows a communication system 10 according to an embodiment. The system 10 comprises a client device 11, a web server 12, a domain server 13, and an optional (third-party) content server 14. The client device 11 is configured for data communication with the web server 12, domain server 13, and, when applicable, content server 14 via a network 15, typically comprising the Internet. In the embodiment shown, the client device 11 is in data communication with the content server 14 via the domain server 13.

The system 10 of FIG. 1 should be understood as an exemplary representation of data connections between various elements, however, should not be considered limiting; for example, certain embodiments may utilise fewer elements than shown while others may utilise additional elements. Furthermore, the various servers 12-14 should be understood, unless otherwise stated, as representing functional elements—although each server 12-14 may be embodied in separate physical hardware, two or more of said servers 12-14 may be embodied in the same physical hardware, for example as logically distinct elements. Similarly, the client device 11 should be understood, unless otherwise stated, as a functional element allowing a user (or, in fact, users) to interact with the system 11.

The client device 11 is configured to run an application suitable for requesting web content (e.g. via the http protocol), typically a web browser (as assumed herein). The web browser is enabled to communicate with the web server 12 hosting a particular website. For example, the web browser can make such a communication in response to a user input (e.g. by selecting a hyperlink directed towards the website or by entering an URL address of the website) or automatically in response to an instruction made by software executed on the client device 11 (which can be the same web browser).

A client device 11 can be any suitable computing hardware for running the application suitable for requesting web content, such as a personal computer (PC) or smartphone. Other devices are also envisaged, such as smart watches, tablets, and various form factor of PC including desktop, laptop, and netbook. A common property of said client devices 11 is enablement of network data communication with the network 15, such as wired (e.g. via Ethernet) or wireless (e.g. WiFi—such as one or more of the various IEEE 802.11 standards). For the purposes of the present disclosure, no particular data communication is assumed. The client device 11 can implement any number of operating systems, such as one or more of Microsoft Windows-compatible operating system (OS), Apple OS X, and a Linux distribution. Smartphones are known to implement Android or iOS operating systems, amongst others.

The various servers 12-14 can be implemented in appropriate hardware as desired. For example, each server 12-14 can be implemented in dedicated computing hardware. However, cloud-based implementations are also envisaged, such as provided by Amazon Web Services (AWS), Microsoft Azure, Google Cloud Platform, and Oracle Cloud, in which one or more servers 12-14 are implemented as virtual servers. Generally, each server 12-14 is associated with a processor and memory, wherein the processor executes code to implement the functionality of said server 12-14 and the memory is provided to store said code as well as to provide a working memory space. The memory can comprise both volatile and non-volatile memories. Each server 12-14 is provided with access to said network 15 and/or directly to one or more of the other servers 12-14, depending on the requirements of the particular implementation.

Generally, the network 15 is flexible and may receive data communications via any number of protocols, such as Ethernet, 802.11, worldwide interoperability for microwave access (WiMAX), 3G, 4G, CDMA, digital subscriber line (DSL), etc. Similarly, the networking protocols used on the network 15 can include any number of protocols, such as multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 15 can be represented using technologies and/or formats, for example, one or more of: the hypertext mark-up language (HTML), the extensible mark-up language (XML), and JavaScript Object Notation (JSON). In addition, all or some of communications can be encrypted using conventional encryption technologies such as secure sockets layer (SSL), transport layer security (TLS), and Internet Protocol security (IPsec).

Reference herein is made to "browser executable code", with a primary example being JavaScript. JavaScript is a well-known technology of the World Wide Web, itself an application running on the Internet. Although, by some estimates, 97% of websites use JavaScript for client-side web page behaviour (that is, generating web page content and behaviours through execution of JavaScript of the web browser of client devices 11), the particular browser executable code and corresponding programming language should not be considered constraining, unless the context or particular claims dictates otherwise. Relevantly, the browser executable code should be suitable for execution on a web browser of a client device 11 to cause the web browser to undertake communication functions, generate content, or other dynamic behaviours.

Various embodiments are described below for providing functionality without utilising third-party cookies which may be similar in effect (at least, from the perspective of the user of the user device 11) to certain functionality known to be enabled by the setting of third-party cookies. Generally, the scenarios described herein include a web browser accessing an internet resource being a web page (as assumed herein) hosted by the web server 12. The web browser is directed to the address of the web page specified, for example, by its Uniform Resource Locator (URL).

According to embodiments, both the web server 12 and the domain server 13 are configured to receive requests from the client device 11 and to provide a response. For example, a request can be for content and the response can comprise that content. Typically, as assumed herein, the requests are according to the Hypertext Transfer Protocol (HTTP) (or an extension protocol such as Hypertext Transfer Protocol Secure (HTTPS)) "GET" messages and the responses comprise HTTP/HTTPS response messages. Additionally, a response can comprise content including hypertext mark-up language (HTML) code defining an appearance and functionality of the web page. The HTML code define a variety of different pieces of content. The response also comprises HTTP headers.

Generally, when a web browser of user device 11 accesses an internet resource, it can be configured to communicate web page specific data with the request that has previously been stored by the web browser due to a previous access of the internet resource. An example is an ETag (having an ETag value). An ETag is defined as a part of HTTP and is set on the client device 11 by the resource when responding to the request. That is, if the web browser has previously communicated with the resource, it can have stored an ETag value that was set during the previous communication. Generally, the ETag value is specifically associated with the resource, for example, associated with its URL. ETag values can be valid for a time limit or not. In another embodiment, the web page specific data is stored in a local storage accessible to the web browser, for example, via execution of suitable code. For convenience, certain embodiments are described herein which relate to the use of ETags as the web page specific data, although it should be understood this is not intended to be limiting.

The web browser operating on the client device 11 is configured to store data in the form of cookies. The cookies can be of a variety of types known in the art. Relevantly, the web page specific data is not equivalent to a cookie—for example, for the purposes of the present disclosure, the web page specific data is unavailable to executable code.

Figure 2:
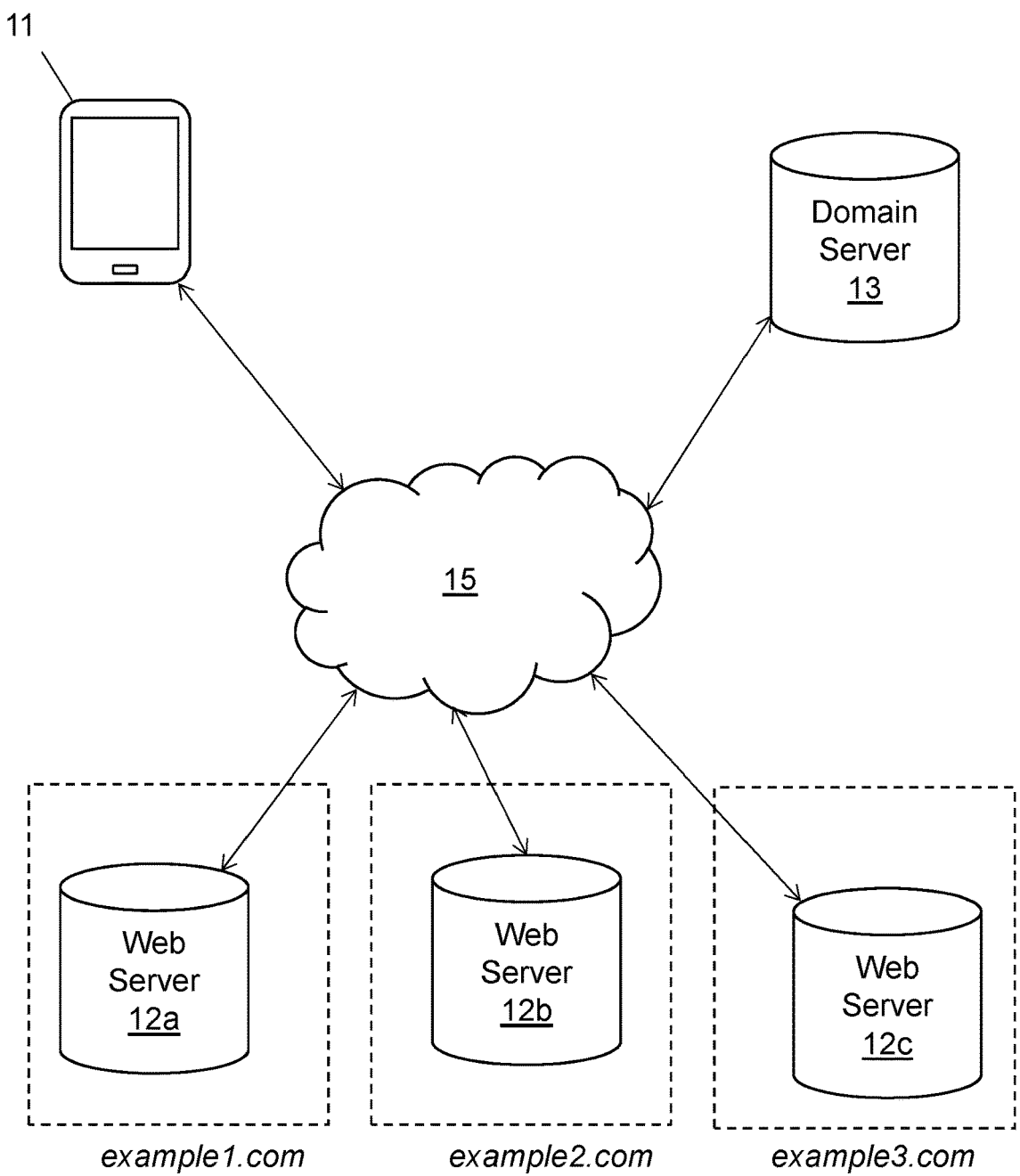
FIG. 2 shows an arrangement for cookie propagation for certain embodiments.

Referring to FIG. 2, a topology is shown relevant for certain embodiments in which a plurality of web servers 12a-12c (generally, any number of web servers 12) are in communication with network 15. Domain server 13 is also shown in communication with the network 15. As with FIG. 1, a representative client device 11 is also shown in communication with the network 15; therefore, client device 11 is enabled to communicate with each web server 12a-12c and the domain server 13 via said network 15.

Relevantly, the web servers 12a-12c are distinguished in that they represent web resources (e.g. web pages) associated with different domains (represented by broken-lined boxes); that is, first web server 12a is associated with a first web page on a first domain (e.g. www.example1.com), second web server 12b is associated with a second web page on a second domain (e.g. www.example2.com), and third web server 12a is associated with a third web page on a third domain (e.g. www.example3.com). Therefore, first-party cookies associated with each web server 12a-12c are not accessible to the other web servers 12a-12c.

One or more embodiments herein described can be utilised to "propagate" cookies between the different domains. Here, "propagate" and "cookie propagation" refer to creating first-party cookies on the client device 11 associated with each domain based on common information. For example, if information is created or determined by a visit by the client device 11 to a web resource of one of the domains (e.g. the first domain) and recorded within a first-party cookie, a subsequent visit to a web resource of another of the domains (e.g. the second domain) results in the recording of the information within a first-party cookie associated with this next visited domain. Therefore, the common information is effectively stored in separate first-party cookies for each web resource of the different domains.

The overall effect is that the common information is "propagated" between cookies for each domain, thereby enabling each web server 12a-12c to generate consistently personalised information by being enabled to identify each visit as being from the same client device 11. In practice, any required information can be propagated. It should also be understood that each domain's cookie can store different actual data (e.g. via domain specific encryption and/or hashing)—however, the common information should be derivable from each domain's cookie.

Certain embodiments utilise "related" web servers 12a-12c, by which there is a common relationship between each individual web server 12a-12c. For example, each related web server 12a-12c may be "owned" (that is, at least operated) by a common entity but providing different services on the different domains. In one illustrative example, the first domain references a car sale service (e.g. advertising and facilitating sales of cars between individuals and/or companies), the second domain references a non-vehicle property sale service (e.g. an auction service), and the third domain references a content provision service (e.g. a news website). Each of these services is offered by a common entity (e.g. Company A) but under different branding and/or owned companies, and therefore, each service is associated with a unique domain.

In the prior art, third-party cookies are utilised to store common information (e.g. an identifier unique to the particular client device 11, and which may also be unique to the particular web browser and/or user of the web browser) that is then accessed by each web server 12a-12c to enable each service to offer individualised content to the user associated with that identifier, as the third-party cookie is accessible by each separate domain.

One or more embodiments described herein are therefore directed towards providing similar functionality of making accessible the common information while avoiding the use of third-party cookies. Depending on the embodiment and implementation, the manner in which said information is utilised may be left to the particular web servers 12a-12c.

For the purposes of the present disclosure, a cookie set in relation to a particular domain is referred to as a "domain cookie". Labels such as "first" and "second" are utilised to distinguish between different domains and their associated web servers 12 and domain servers 13. Similarly, common lowercase suffixes are used to identify different features of the figures that are related to a particular domain. For example, a first web server 12a and a first domain server 13a are addressable at a first domain which can be associated with a first domain cookie, a second web server 12b and a second domain server 13b are addressable at a second domain which can be associated with a second domain cookie, and a third web server 12c and a third domain server 13c are addressable at a third domain, which can be associated with a third domain cookie.

According to an embodiment, with reference to FIGS. 3A and 3B, a method is described relating to setting non-cookie web page specific data within the web browser of a client device 11. One example known in the art is an ETag. The method also describes setting a first domain cookie on the web browser of the client device 11 in relation to a first web page. The first domain cookie is a first-party cookie, in that it is set in association with the same domain as the first web page (first domain), although it is set by the first domain server 13a rather than the first web server 12a. Relevantly, the first domain cookie is accessible by executable code—for example, the first domain cookie does not have the "HttpOnly" attribute set. Relevantly, the web page specific data should be of a form which is not accessible to the code executed on the client device 11—for example, an ETag value is not accessible by JavaScript. It can be preferred that the web page specific data is only accessible to web-based servers such as the web servers 12 and domain servers 13.

At step 300, the client device 11 communicates a request for content to the first web server 12a, which as described above is associated with a first domain (e.g. www.example1.com). The request typically will specify a particular web page for which content is desired—it should be noted that a default web page can be selected (e.g. http://www.example1.com/index.html). At step 301, a response is communicated to the client device 11 from the first web server 12a, the response being determined in accordance with the request. The response comprises a domain server communication instruction (as executable code) for execution by the web browser of the client device 11 (e.g. in the form of JavaScript code) as well as, typically, content for display on the web browser.

The domain server communication instruction is an instruction for the web browser of the client device 11 to communicate with the first domain server 13a. Relevantly, the domain server 13 is present on the same domain as the first web server 12a, although the domain server 13 can be located at a different IP address to the web server 12. In a particular implementation, a subdomain of the first domain is used to address the first domain server 13a (e.g. http://processing.example1.com). Therefore, as discussed above, a first domain cookie set due to communication with the first domain server 13a will be a first-party cookie (due to sharing its domain with the first web server 12a).

Depending on the embodiment, the domain server communication instruction comprises a first executable code configured to cause the web browser to communicate with the first domain server 13a. Alternatively, the domain server communication instruction comprises an instruction for the web browser to obtain the first executable code from the domain server 13a. In either case, as a result of step 301, the web browser is provided with the first executable code.

At step 302, the web browser executes the first code. The first code is configured to undertake a check step 303. Here, the web browser performs a check for a first domain cookie previously stored by the web browser. As previously discussed, the first domain cookie, if present, is accessible to the first code. Relevantly, as discussed, the first domain cookie is associated with the domain of the web page (i.e. the first domain).

If the first domain cookie is not present, then the first code is configured to cause the web browser to communicate a request to the first domain server 13a, at step 310. If available, an ETag value (or, depending on the embodiment, other web page specific data) associated with the web page is communicated with the request (for ETags, if present, the ETag value will be communicated as defined by the HTTP standard).

Next, at step 311, the first domain server 13a is configured, upon receiving the request, to determine whether the ETag value is present with the request.

The presence of the ETag value in this situation (where a first domain cookie is not present) indicates to the first domain server 13a that the web browser has previously accessed a second website (e.g. associated with the second web server 12b), hosted on a different domain (e.g. the second domain) to the first website, and had a second domain cookie set in relation to the second domain by the second domain server 13b (therefore, the second domain cookie is a first-party cookie of the second domain, and therefore not accessible in communications with the first domain server 13a). In this scenario, the first domain server 13a is configured to communicate a reply to the client device 11 setting a domain cookie associated with the first domain with a value derived from (for example, comprising) the ETag value, at step 314. As a result, the web browser stores a "first-party" first domain cookie associated with the first domain which records the same information as the second domain cookie associated with the second domain.

If an ETag value is not present, then the first domain server 13a is configured to determine data for storing in both a first domain cookie and as an ETag value, at step 312, and to send a response to the web browser of the client device 11 instructing it to set both the first domain cookie and the ETag value, at step 313. Regarding step 312, the particular means by which the first domain server 13a determines the data depends on the implementation. However, in one particular example, the data is obtained or derived from the content server 14 (for example, from a set-cookie command issued by the content server 14)—in this case, the first domain cookie and ETag value reflect the information intended for storage obtained from the content server 14. The set-cookie command issued by the content server 14 is effectively an instruction to set a third-party cookie, as the content server 14 is on a different domain to the first domain. In another example, the first domain server 13a is itself configured to determine the data for storing as the first domain cookie and ETag value—it can be, for example, a randomly or procedurally generated identifier or other data for future use by the web servers 12a-12c and/or the domain servers 13a-13c.

Considering now a result of check step 303 where the first domain cookie is present. The first code is configured to, in response, cause the web browser to communicate a request to the first domain server 13a, at step 320. The request is accompanied by the information stored within the first domain cookie (thereby making the information available to the first domain server 13a) and, where available, an ETag value (or, depending on the embodiment, other web page specific data).

At step 321, the first domain server 13a checks whether the request is accompanied by the ETag value.

If the request is not accompanied by an ETag value, then the first domain server 13a communicates a response to the client device 11 comprising a set ETag instruction, where the ETag is set to the value of the first domain cookie (or at least, a value derived from the first domain cookie data), at step 322. In this way, in effect, the web browser has stored the information recorded within the first domain cookie value in the ETag.

On the other hand, if the request is accompanied by an ETag value, then the first domain server 13a can communicate a response to the client device 11 specifying that no update is required to either the ETag or the domain cookie, at step 323. Equivalently, the response can be an instruction to refresh either or both of the ETag value and the first domain cookie (for example, this may be useful where either or both of the ETag and domain cookie have a finite lifetime).

Figure 3:
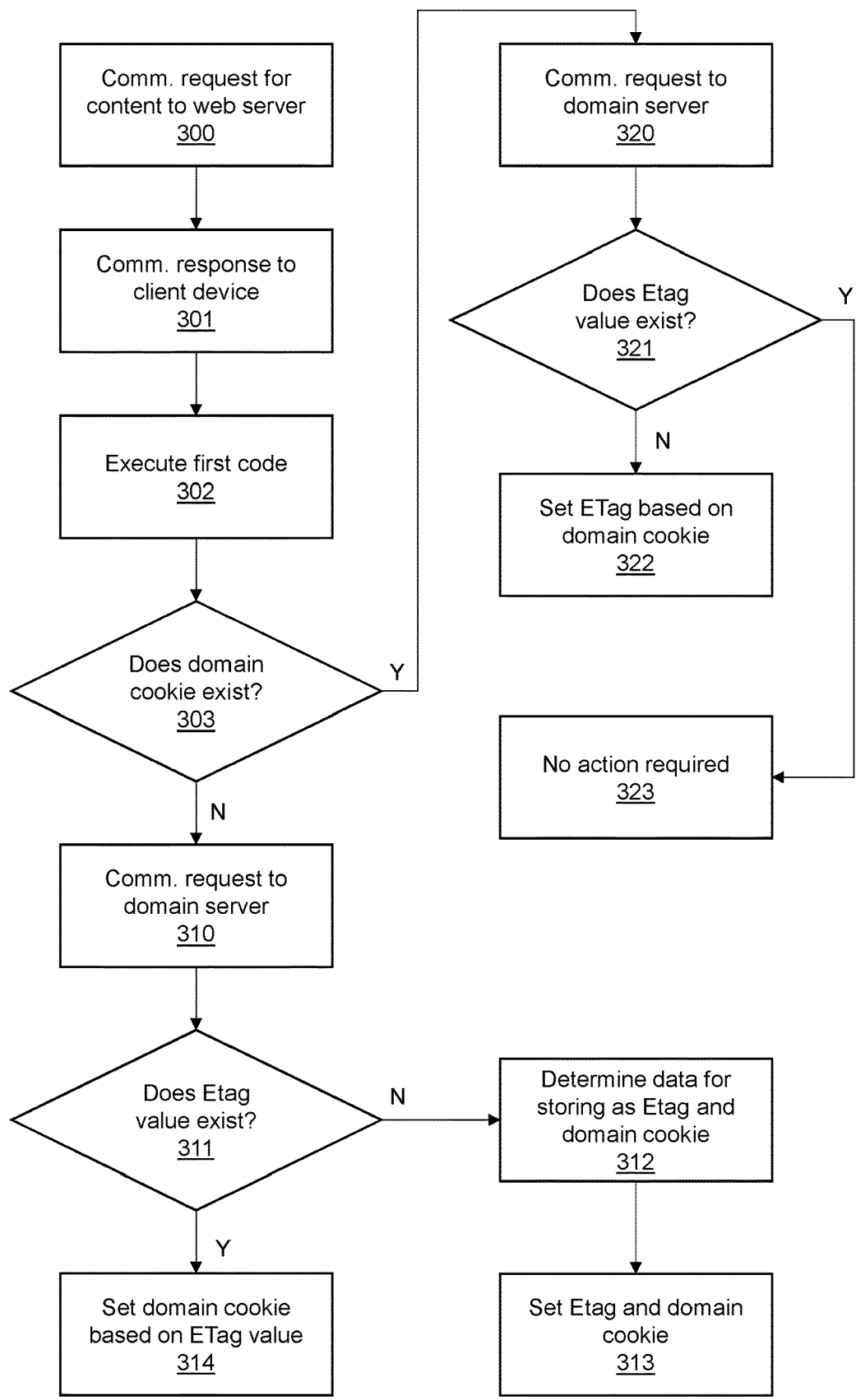
FIG. 3 shows a method for propagating cookies, according to an embodiment.

FIG. 3 therefore defines a mechanism by which the data of a first-party domain cookie associated with a one web page can be copied to a first-party domain cookie associated with another web page. Therefore, the data need only be determined once, in relation to the one web page, and then propagated amongst any other web pages associated with other domains. As a result, the method of FIG. 3 provides first-party domain cookies for each different domain recording the same information—in effect therefore, the collection of first-party domain cookies can advantageously provide a similar function as a single third-party cookie.

According to an embodiment, one or more of the related domain cookies are modified with respect to the original information. For example, a domain cookie can be subjected to an anonymisation routine in order to obfuscate the original information. It is preferred that the modification is reversible by the relevant domain server 13—such that, a domain server 13 is accurately enabled to determine the original information from its associated domain cookie. For example, encryption keys can be utilised using, for example, the domain names of the domain cookies such that each domain cookie is associated with different encryption output derived from the same information. In another example, a random prefix and/or suffix of known size (known, that is, to the related domain server 13) is attached.

Figure 4A:
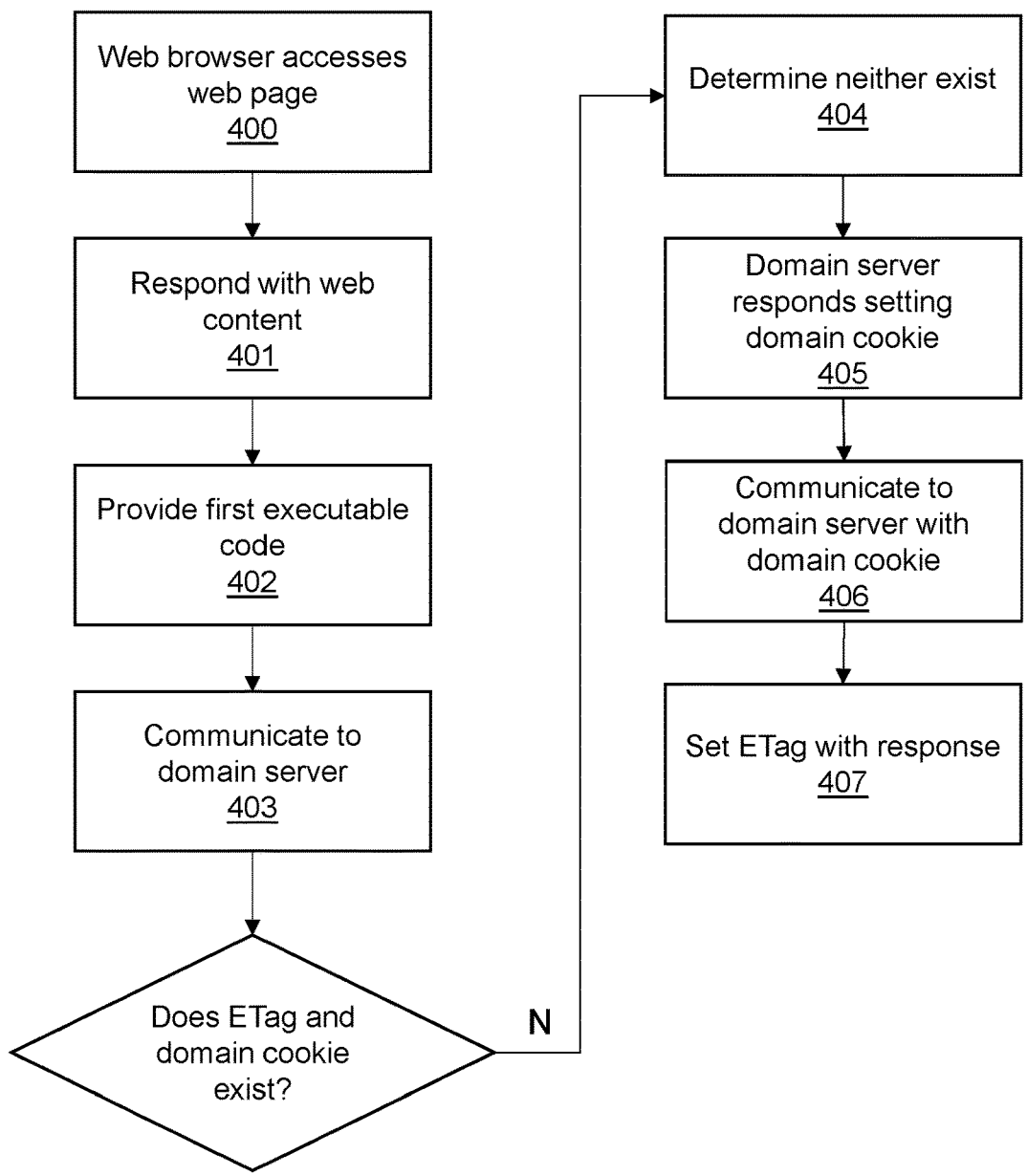
FIGS. 4A and 4B show a particular implementation utilising the method of FIG. 3.
Figure 4B:
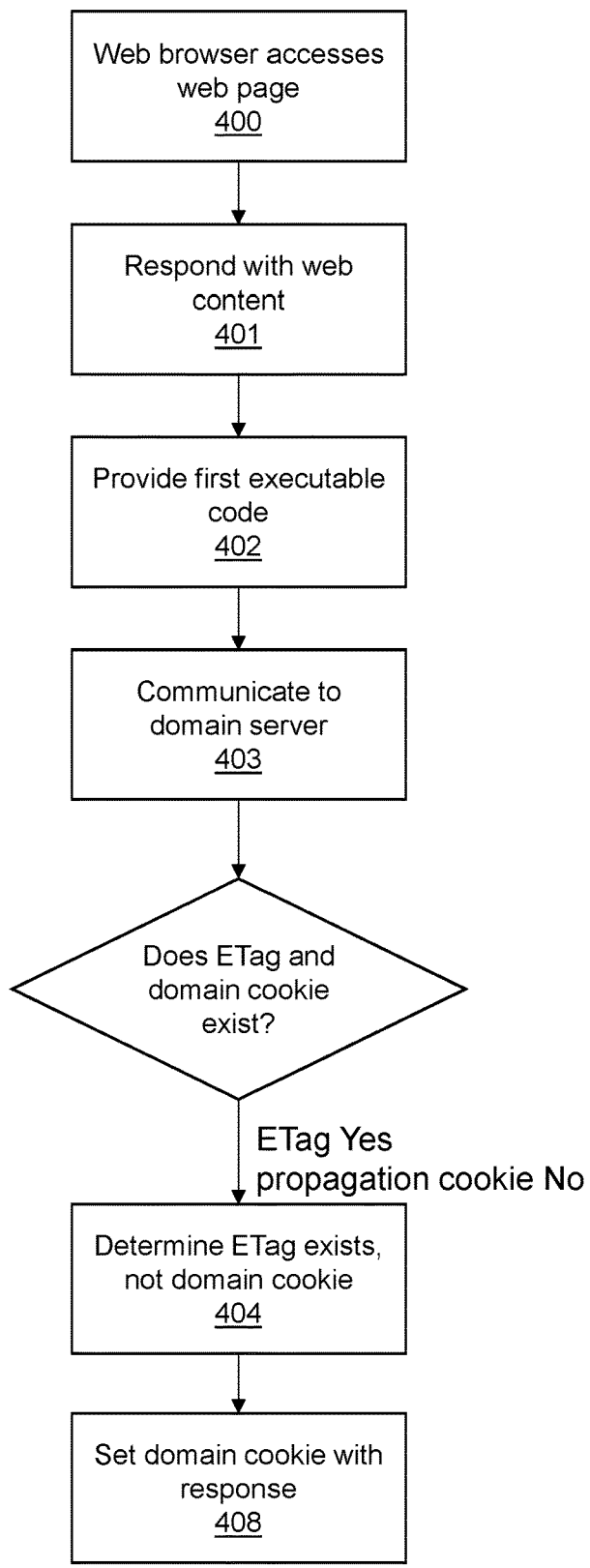

FIGS. 4A and 4B show an example implementation of the embodiment of FIG. 3. At step 400, a user of a web browser on the client device 11 directs the web browser to a first web page hosted by first web server 12a. The first web server 12a returns a response comprising the HTML code defining the content for display on the client device 11, at step 401. The response also comprises first executable code comprising instructions as discussed with reference to FIG. 3, at step 402. Alternatively, the response comprises an instruction to obtain said first executable code from the first domain server 13a, and the web browser obtains the first executable code as a result (again, at step 402).

At step 403, the web browser, due to execution of the first executable code, communicates with the first domain server 13a and communicates, if available, a first domain cookie associated with the first domain server 13a. The first domain server 13a also obtains an ETag value (or more generally, web page specific data which is not accessible to the executable code and is accessible to the first domain server 13a irrespective of which domain server 13 originally set the web page specific data value (i.e. which domain was accessed when the web page specific data was set). For example, the web browser of the client device 11 access a web resource, such as an image, located on the first domain server 13a and, in doing so, communicates an ETag value (if available) to the first domain server 13a associated with the image. The first domain server 13a is therefore configured to identify the ETag value of the particular image. The first domain cookie will be available if previously set by the first domain server 13a due to a previous communication. The ETag will be available if previously set by any one of the domain servers 13 due to a previous communication (e.g. when the image is communicated to the client device 11, an appropriate ETag value (according to embodiments herein described) is set in association with the image.

FIG. 4A shows a situation where neither the first domain cookie nor the ETag are available for communication to the first domain server 13a, determined at step 404. In this case, the method of FIG. 3 results in step 313 (setting a value for the first domain cookie and the ETag). The value for the ETag and the first domain cookie can be generated by the first domain server 13a, the first web server 12a, or a content server 14 (depending on the implementation).

According to this particular example, the first domain cookie (first domain) is set in a first communication, at step 405. The web browser is then configured to communicate again with the first domain server 13a, sending at step 406 a data of the first domain cookie (which is now set due to step 505). Considering the method of FIG. 3, the first domain server 13a will end at step 322—a response is communicated at step 407 to the client device 11 instructing it to set an ETag equivalent to the first domain cookie (first domain). In this sense, the first executable code is essentially run twice—the first execution giving the result of step 313 of FIG. 3 and the second execution giving the result of step 322 of FIG. 3.

FIG. 4B shows a situation where the first domain cookie (first domain) is not available but the ETag is available for communication to the first domain server 13a, determined at step 404. In this case, the method of FIG. 3 results in step 314 (setting a value for the first domain cookie based on the ETag). The implication is that the web browser has visited a web page hosted on a different domain to the current web page, but that utilises a related domain server 13. Therefore, another domain cookie has been set in relation to the different domain and can be utilised for setting a first domain cookie for the first domain.

According to this example, first domain cookie (first domain) is set by a response communicated from the first domain server 13a to the client device 11, at step 408. Further execution of the method of FIG. 3 can occur during the current process but will result in step 323 of FIG. 3—no action required. Again, in this sense, the first executable code can be run twice—the first execution giving the result of step 314 of FIG. 3 and the second execution giving the result of step 323 of FIG. 3.

The embodiment of FIG. 3 (and examples of FIGS. 4A and 4B) therefore utilises non-cookie web page specific data stored on the web browser of a client device 11 to effectively "signal" whether another domain cookie for another related domain is present, when a web page of a first domain is accessed.

Figure 5A:
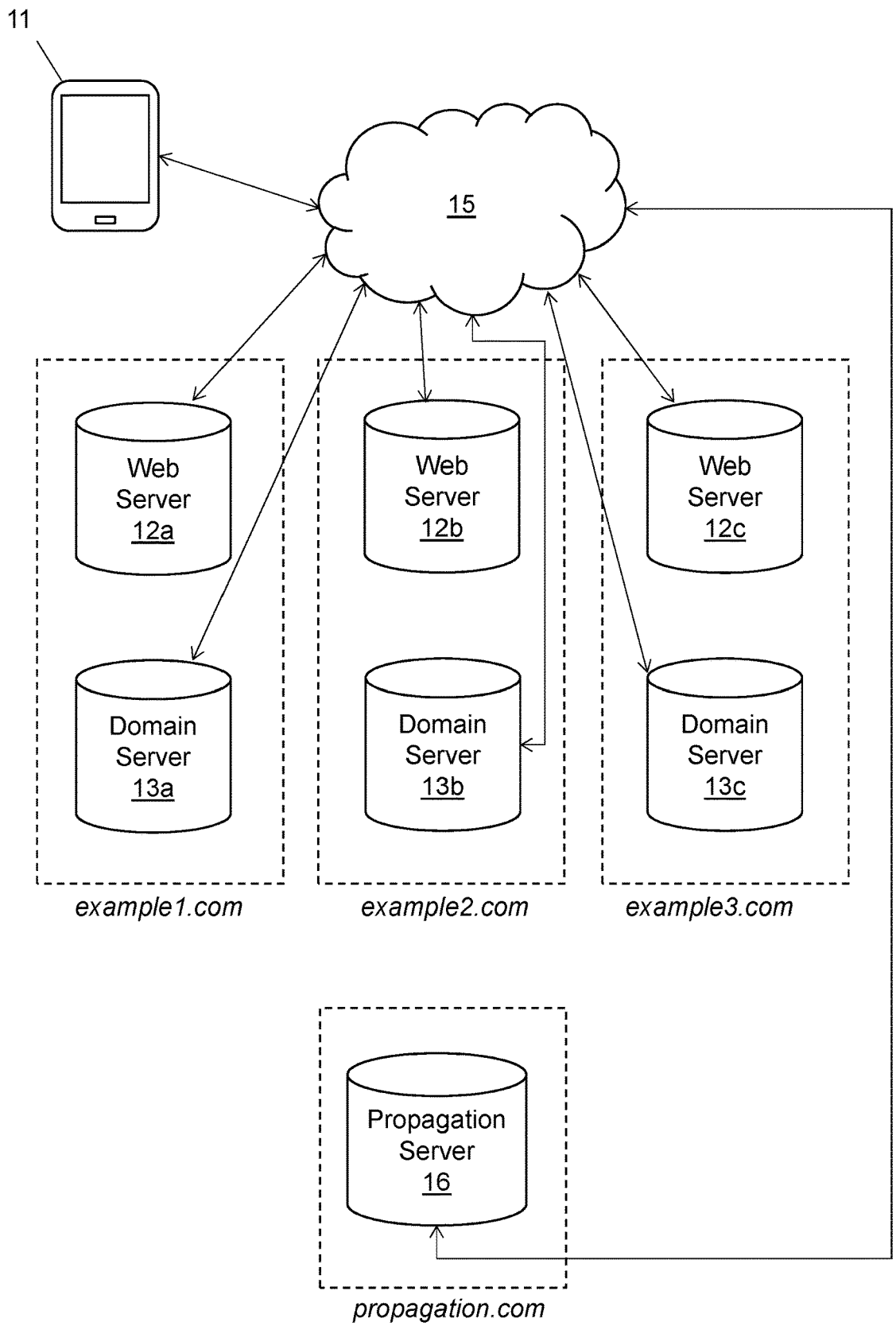
FIGS. 5A and 5B show a method for propagating cookies, according to another embodiment.

According to an embodiment, a propagation server 16 is associated with a propagator domain (e.g. www.example-server.com), as shown in FIG. 5A. The propagation server 16 is configured to facilitate propagation of cookie information among domain cookies, which are each associated with one of a plurality of domain servers 13a-13c—that is, the propagation server 16 can facilitate an exchange data with each domain server 13a-13c. The propagation server 16 is in data communication with the network 15. It is possible that one or more of the domain servers 13 can be embodied as a logical function of the propagation server 16, although it may be preferred that each domain server 13 is logically and/or physically distinct to the propagation server 16. Also shown in FIG. 5A is a plurality of web servers 12a-12c. As with FIG. 1, a representative client device 11 is also shown in communication with the network 15; therefore, client device 11 is enabled to communicate with each web server 12a-12c, each domain server 13a-13c, and the propagation server 16, via said network 15. Relevantly, each domain server 13a-13c is addressable at a respective domain as one of the web servers 12a-12c as described above.

In an implementation, each domain server 13 is addressable via a subdomain of its associated domain. The subdomains can be labelled as desired, it is relevant that each is resolvable to the network address (e.g. IP address and optionally TCP or UDP port number) of the associated domain server 13. Each domain server 13 can be located at the same or different IP address to its associated web server 12, depending on the implementation.

Figure 5B:
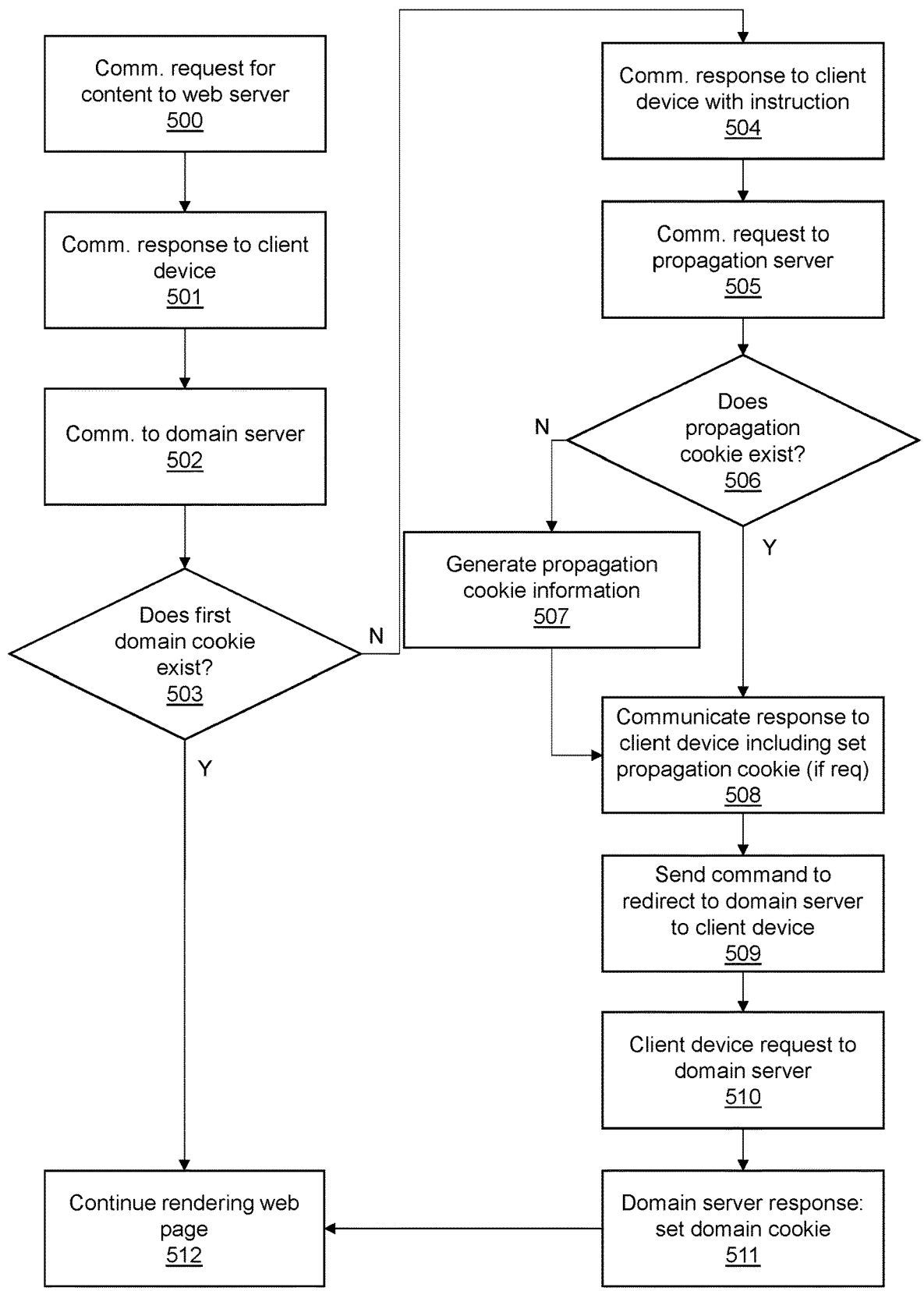

FIG. 5B shows a method relating to setting a first domain cookie associated with the first domain and therefore accessible to the first web server 12a and the first domain server 13a, in dependence on the presence and value of a common cookie ("propagation cookie") associated with the propagator domain. The common cookie can be, for example, an identifier associated with the particular client device 11 (in this case, referred to herein as a "userID").

At step 500, the client device 11 communicates a request for content to first web server 12a. The request typically will specify a particular web page for which content is desired—it should be noted that a default web page can be selected (e.g. http://www.example1.com/index.html). At step 501, a response is communicated to the client device 11 from the first web server 12a, the response being determined in accordance with the request. The response comprises a domain server communication instruction (as executable code) for execution by the web browser of the client device 11 (e.g. in the form of JavaScript code), configured to cause the client device 11 to communicate to the first domain server 13a. The response also, typically, comprises content for display on the web browser. Alternatively, or in addition, the first web server 12a can send a redirect instruction (e.g. via location headers in the response) to the first domain server 13a.

At step 503, the first domain server 13a receives the communication from the client device 11 and analyses the content to determine if a previously set first domain cookie is present (typically in headers in the case of HTTP).

In a case where a first domain cookie is present (e.g. cookie propagation is not required), the method simply proceeds to web-page rendering step 512 (discussed below), which can be effected by the first domain server 13a communicating an instruction to the client device 11 to undertake a further communication to the first web server 12a.

In a case where a first domain cookie is not present (e.g. cookie propagation or initial creation is required), the first domain server 13a communicates a response to the client device 11 from the first web server 12a, at step 504. The response comprises a propagation server communication instruction (e.g. as executable code) for execution by the web browser of the client device 11 (e.g. in the form of JavaScript code), configured to cause the client device 11 to communicate to the propagation server 16. Alternatively, or in addition, the first domain server 13a can send a redirect instruction (e.g. via location headers in the response) to the propagation server 16. In response, the client device 11 communicates a request to the propagation server 16 at step 505, the request optionally including information identifying the first domain server 13a (for example, information can be passed in a URL or via a suitable network protocol).

At step 506, the propagation server 16 receives the communication from the client device 11 and analyses the content to determine if a propagation cookie is present (typically in headers in the case of HTTP), at step 505. The presence of a propagation cookie indicates that the client device 11 has previously visited a related domain (e.g. the second or third domain) resulting in a domain cookie (e.g. second domain cookie or third domain cookie, etc.) being set in relation to the related domain. The absence of a propagation cookie indicates that the client device 11 has not previously visited a related domain and had a domain cookie set for the related domain.

In a case where a propagation cookie is not present, at step 507, the propagation server 16 is configured to determine information for recording within a new propagation cookie on the client device 11. The information can be randomly generated or procedurally generated, or alternatively, generated via a communication with a content server 14 (not shown in FIG. 5B).

In either case, the propagation server 16 communicates a response to the client device 11, at step 508. The response comprises a domain server communication instruction (e.g. as executable code) for execution by the web browser of the client device 11 (e.g. in the form of JavaScript code), configured to cause the client device 11 to communicate to the original domain server 13 (i.e. in this example, the first domain server 13a), at step 509. Alternatively, or in addition, the propagation server 16 can directly effect a redirect (e.g. via location headers in the response) to the first domain server 163.

In the case that step 507 is performed, the response also comprises a set propagation cookie command to cause the client device 11 to set a propagator associated with the propagator domain recording the generated information.

In response, the client device 11 then communicates a request to the first domain server 13a, at step 510. In response to the request, at step 511, the first domain server 13a is configured to determine the information recorded in the propagation cookie and communicates a response to the client device 11 comprising a set cookie command to cause the client device 11 to set a first domain cookie associated with the first domain recording the information.

In an embodiment, the domain server 13a obtains the information from the web browser of the client device 11. For example, the domain server communication instruction of step 508 includes the information recorded in the propagation cookie and is configured to cause the web browser of the client device 11 to communicate the information (which is preferably encrypted) to the first domain server 13a. For example, the information can be passed in a URL or via a suitable network protocol. Here, the client device 11 is effectively utilised as an intermediary, which may advantageously allow for method to avoid direct communications between the propagation server 16 and the domain servers 13—this may provide for improved privacy and/or security (or at least a perception of an improvement).

In an alternative embodiment, the propagation server 16 is configured to identify the first domain server 13a (more generally, the particular domain server 13 which initiated the client device 11 communication to the propagation server 16, derivable from the request received by the propagation server 16) and to communicate the generated or previously recorded information for the propagation cookie (or, at least, data derived from the recorded information) to the first domain server 13a along with, typically, information identifying the particular client device 11.

The response also comprises a web server communication instruction (e.g. as executable code) for execution by the web browser of the client device 11 (e.g. in the form of JavaScript code), configured to cause the client device 11 to communicate to the original web server 12 (i.e. in this example, the first web server 12a). Alternatively, or in addition, the first domain server 13a can send a redirect instruction (e.g. via Location headers in the response) to the first web server 12a.

In an embodiment, one or more of the domain servers 13 are implemented as functions executed by the corresponding web server 12 (i.e. the web server 12 sharing the same domain). In these cases, the domain servers 13 described herein should be understood in terms of their functional steps, for example, the setting and reading of domain cookies and the communication and reception from the propagation server 16 of recorded information (or derived data). In this case, it may be unnecessary to explicitly communicate a web server communication instruction to the web browser.

The method then proceeds to web page rendering step 512 (which can also be arrived at after step 503). At this step, the first web server 12a communicates with the client device 11 (which may comprise multiple separate instances of communication) and can utilise the content of the first domain cookie to generated personalised content—the first domain cookie is accessible to the first web server 12a due to it sharing the first domain with the first domain server 13a.

Accordingly, the method of FIG. 5B can be utilised to effectively propagate cookies (or more generally, the information recorded in a cookie can be propagated amongst different domain cookies) across the various web servers 12a-12c. The propagation cookie is utilised to signal to the propagation server 16 whether or not (through its presence or absence) a client device accessing a particular web server 12 has previously visited another related web server 12 on another domain and, therefore, previously generated information intended to be commonly available to the plurality of related web servers 12 (e.g. all web servers 12a-12c). For example, the information can be a UserID suitable for identifying that the particular client device 11 (or a particular user of said client device 11) has previously visited related websites on different domains. In the case of the information recoded in the propagation cookie being an identifier such as a UserID, the domain cookies can record the UserID or information derived from the UserID as DomainIDs (that is, each DomainID is for the particular domain, but are related in a manner that enables identification of the user). Therefore, the collection of domain cookies having related DomainIDs can be utilised by the related web servers 12 to generate personalised information for the client device 11. The direct communication between the domain servers 13 and the propagation server 16 enables the effective propagation.

Figure 7A:
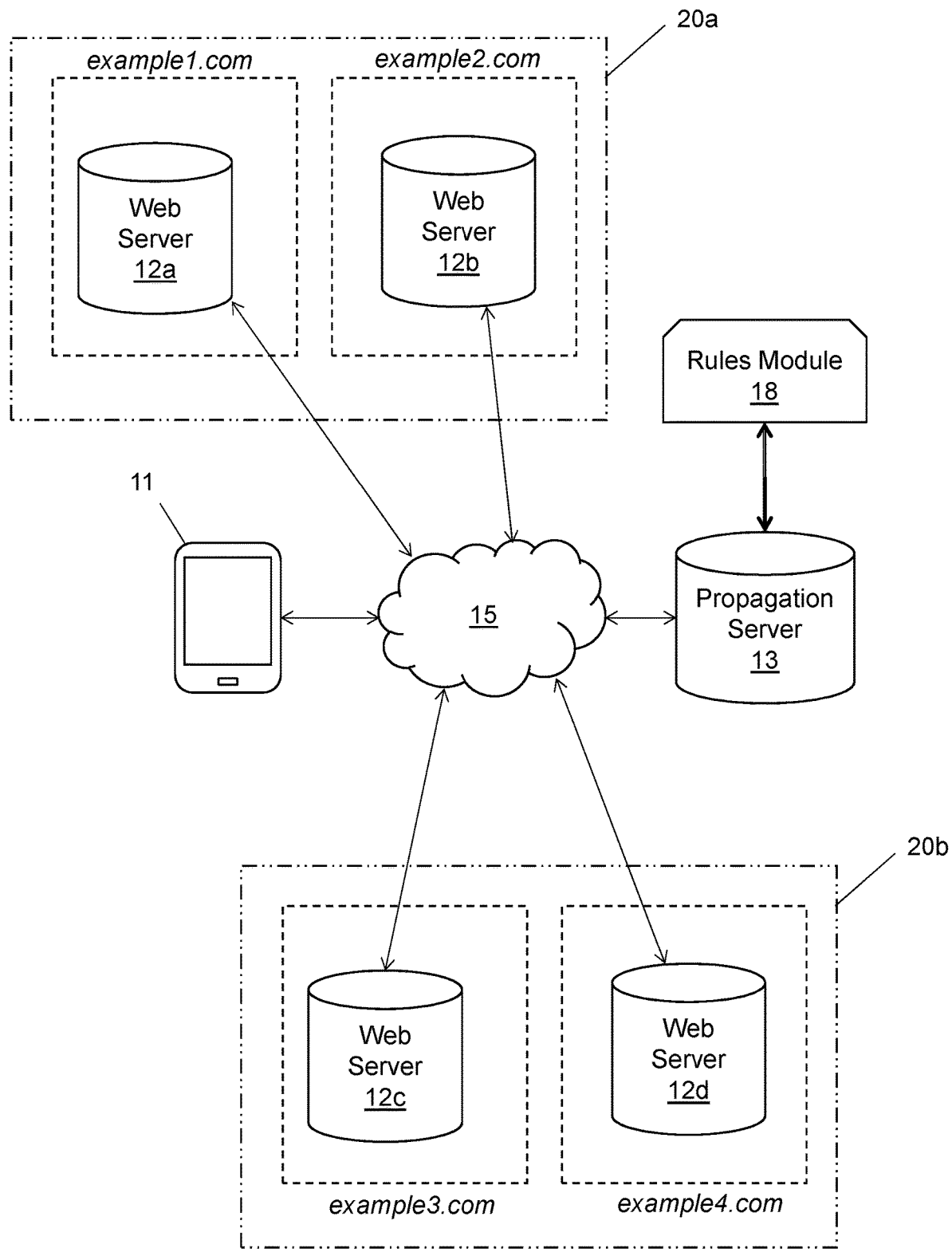
FIGS. 7A-7C show embodiments for generating a user identifying cookie and propagating the information.
Figure 7B:
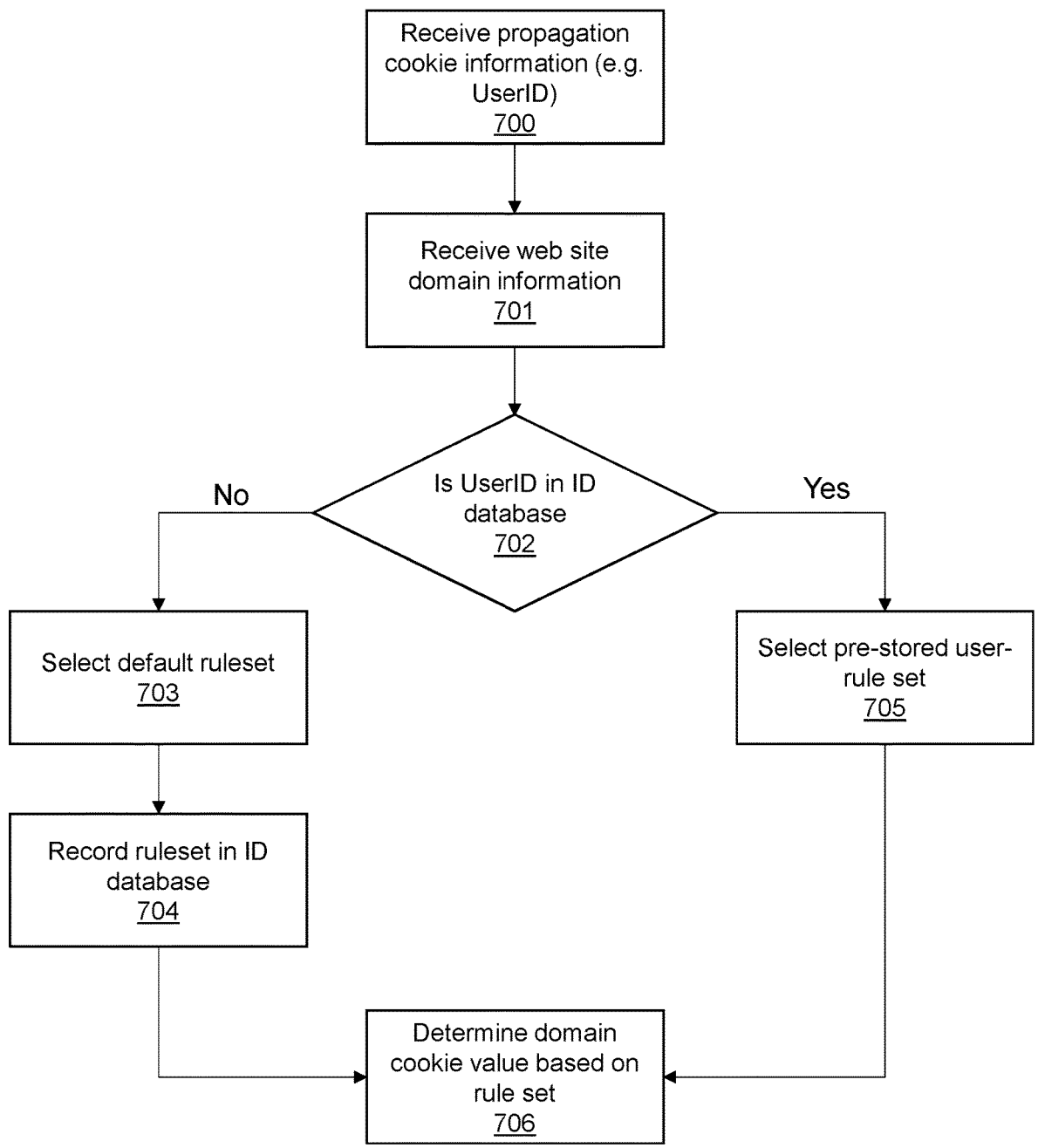
Figure 7C:
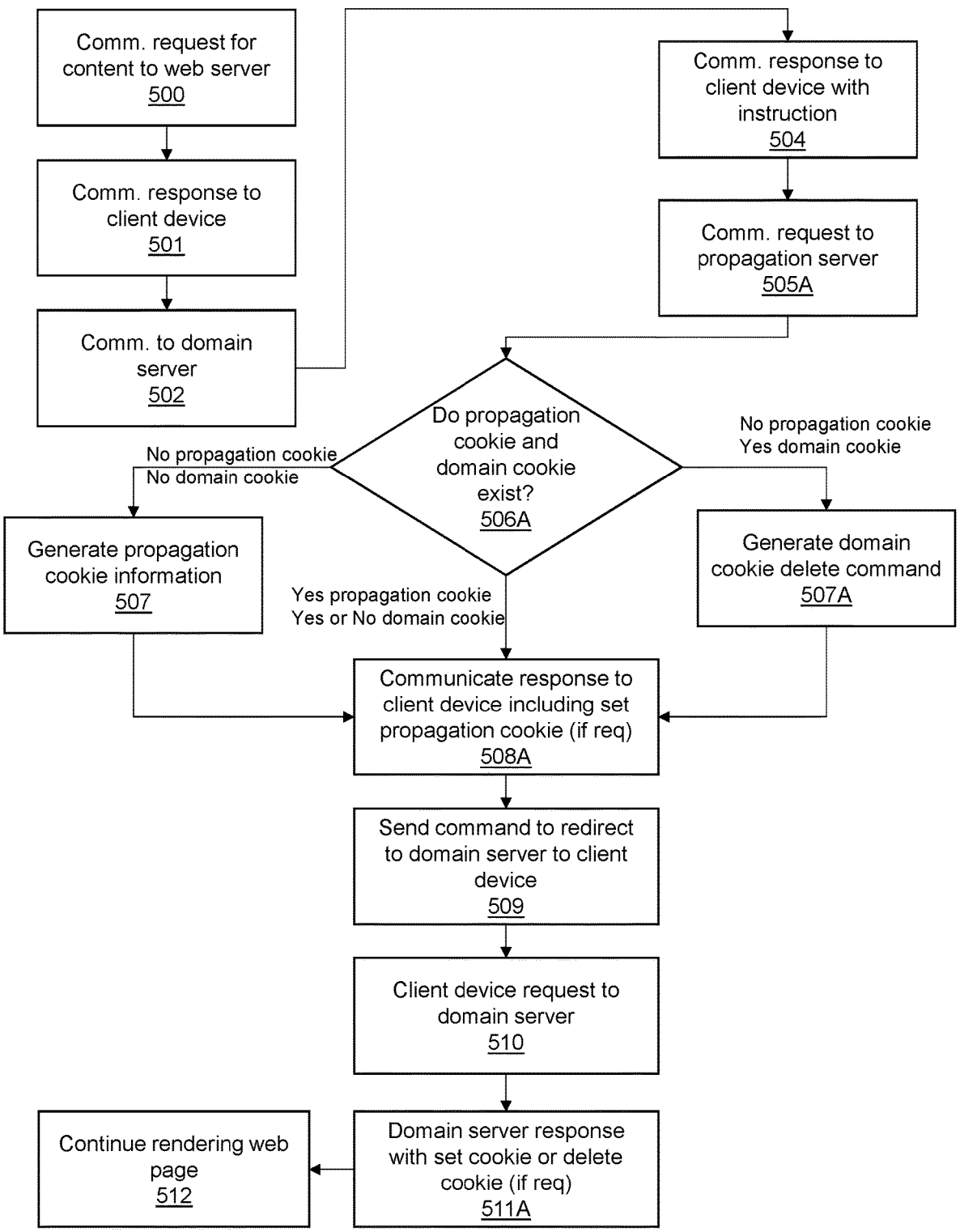

According to an embodiment, with reference to FIGS. 7A-7C, the propagation server 16 is interfaced with a rules module 18 (see FIG. 7A). The rules module 18 can be a logical function of the propagation server 16 (assumed herein) or can be implemented as a different physical or logical server in data communication with the propagation server 16. Also shown are four web servers 12a-12d, where web servers 12a, 12b are associated with a first group 20a and web servers 12c and 12d are associated with a second group 20b. Although web servers 12 can be grouped according to any particular relationship, for the present purposes, it is assumed that the first group 20a comprises web servers 12a, 12b of domains administered (e.g. owned) by a first entity and that second first group 20b comprises web servers 12c, 12d of domains administered (e.g. owned) by a second entity, different to the first. Relevantly, according to the present embodiment, propagation server 16 is configured to manage cookie propagation for all web servers 12a-12d (more generally, web servers 12 belonging to different groups 20).

The rules module 18 is configured to apply propagation rules before communication of a response comprising a domain cookie to a client device 11 and/or domain server 13 (depending on the embodiment). The propagation rules are used to determine whether a domain cookie is set and, if so, with what specific data (for example, the specific data can record common information to other domain cookies and/or the propagation cookie in a different format, for example, due to unique encryption which may be associated with the particular domain).

In an embodiment, at least a portion of the propagation rules for use in generating data for a particular domain cookie is stored in the associated propagation cookie itself—these are referred to herein as user-set propagation rules. The user set propagation rules in this embodiment are stored in the user's web browser which may advantageously avoid a central location of the user-set propagation rules of a number of different users. In this embodiment, the user-set propagation rules are preferably recorded in an encrypted form such that a direct read of the propagation cookie does not reveal the user-set propagation rules stored in that propagation cookie.

In an embodiment, the rules module 18 is alternatively or also configured to maintain a data structure identifying known (that is, previously determined) propagation cookies and related information—for example, as a database (herein, "ID Database"). The data structure can be updated as new propagation cookies are determined and as the related information is changed. The related information includes, for each user, user-set propagation rules (which may be default or customised).

In an embodiment, at least a portion of the propagation rules are set by the propagation server 16 (more generally, an operator of the propagation server 16)—these are referred to herein as system-set propagation rules. For example, the definition of groups 20 can be understood as system-set propagation rules. In an embodiment, at least a subset of user-set propagation rules can override contradictory system-set propagation rules and/or at least a subset of system-set propagation rules can override contradictory user-set propagation rules.

FIG. 7B shows a method for determining a response by the propagation server 16, according to an embodiment. The method of FIG. 7B assumes that there is already a propagation cookie associated with the particular client device 11 (or more particularly, a web browser of the client device 11)—that is, the web browser has previously visited any one of the web servers 12 irrespective of group 20 or a propagation cookie is newly generated prior to implementing FIG. 7B. The propagation cookie effectively represents a user (or, a particular client device 11 or web browser on a particular client device 11) and can be considered, therefore, an identifier. Therefore, for the purpose of exposition, the content of a particular propagation cookie includes a record of a UserID.

In an embodiment, the method of FIG. 7B is performed as part of step 508 of FIG. 5B. In this case, the propagation server 16 is configured to differentiate the information that is stored in the propagation cookie to that which is stored in the domain cookie(s).

At step 700, the rules module 18 receives the information recoded in the propagation cookie (here assumed to be the UserID), and at step 701, receives information identifying the domain of the web server 12 being accessed by the client device 11 (this information can be provided simultaneously).

The rules module 18 then determines the particular user-set propagation rules associated with the user (or, more specifically, the propagation cookie) at step 702. For example, depending on the embodiment, the rules module 18 can obtain the user-set propagation rules from the actual propagation cookie.

In another embodiment, the rules module 18 compares the UserID to the records of the ID database to check if the UserID has previously been stored in the ID database. As with other embodiments, the UserID may be stored in a derived format within the actual propagation cookie, for example, through use of an encryption algorithm. Relevantly, the UserID is derivable from the propagation cookie.

If the rule module 18 cannot determine particular user-set propagation rules (e.g. depending on embodiment, not stored in the propagation cookie or does not exist within ID database), the method proceeds to step 703, where the rules module 18 determines and selects a default ruleset to use as the user-set propagation rules at subsequent step 706. There may be a single default ruleset or there may be a plurality of default rulesets, the rules module 18 being configured to determine one of said default rulesets as appropriate (for example, based on the relevant domain, information about the client device 11, or other factors).

Optionally, at step 704, the rules module 18 stores the selected ruleset as the user-set propagation rules associated with the propagation cookie. For example, in an embodiment, the user-set propagation rules can be set as content of the propagation cookie by setting or updating the propagation cookie on the client device 11. For an embodiment where an ID database is utilised, the rules module 18 stores the selected ruleset within its ID database reference to the propagation cookie information along with a user-specific ruleset which can be simply the same as the selected default ruleset. The user, however, may be provided an option during the method of FIG. 7B, for example by a website redirect or a "pop-up", to customise the default ruleset before it is recorded as user-specific propagation rules.

On the other hand, if the user-set propagation rules do exist within the propagation cookie or the ID database (as applicable), the method proceeds to step 705, in which the rules module 18 obtains these stored user-set propagation rules. The method then proceeds to step 706.

Figure 9:
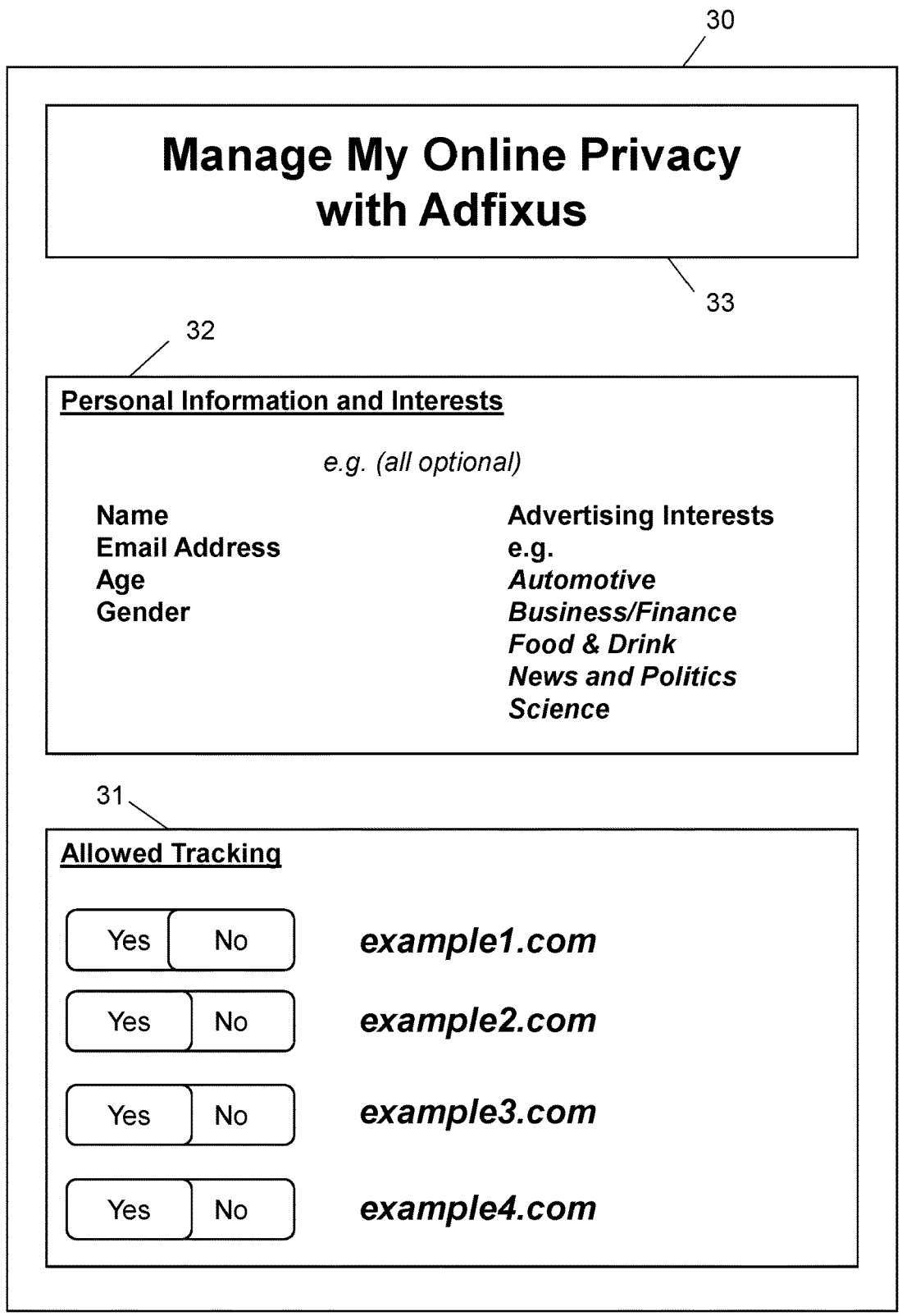
FIG. 9 shows an example approach to user control of propagation rules using a webform or popup.

FIG. 9 shows an example of a user control interface 30 utilised in an embodiment. The user control interface 30 can correspond to a pop-up presented on the web browser to enable the user to, in effect, configure the user's preferences for the user-set propagation rules. Other techniques can be utilised instead of a pop-up; for example, the web browser can be directed to a web page associated with the propagation domain. It should be understood that the user control interface 30 can correspond to multiple "pages" which the user can move between (e.g. as separate menu elements).

Generally, the user control interface 30 enables modification of the user-set propagation rules stored on the web browser through interaction with the propagation server 16. In the example shown, the user control interface 30 comprises a propagation rules section 31. The propagation rules section 31 enables the user to set preferred user-set propagation rules. In the example, shown, the propagation rules section 31 enables setting of which domains the user authorises tracking for—thus, in this example, when the user visits example1.com, in effect, the corresponding web server 12 will ultimately receive a random, anonymous DomainID (or, equivalently, no DomainID) rather than one generated in dependence on the user's UserID, as the user has selected no tracking. In contrast, when the user visits any one of example2.com, example3.com, and example4.com, the corresponding web servers 12 will receive a corresponding DomainID that is generated in dependence on the user's UserID, as the user has authorised tracking. Generally, the propagation rules section 31 comprises means for the user to set which user-set propagation rules are available.

In some embodiments, a user data section 32 is also provided. The user data section 32 allows a user to enter optional information which can assist in the provision of content to the user, but do not constitute a user-set propagation rules. For example, as shown, this can include personal user information such as name, email address, age, gender, and others. In an implementation, the user can select an anonymous email address as an alternative to providing their own address. Also shown in the example is advertising preference information, such as categories of interest to the user. The user data section 32 therefore constitutes additional information, which is typically stored in the user's web browser in combination with domain cookies, and which can be provided to web servers 12 to assist with providing customised content to users.

In an embodiment, the user control interface 30 is associated with the client device 11 communicating with the propagation server 16, for example, as part of step 507. The user can be enabled to utilise the user control interface 30 separately to steps related to the propagation of recorded information. For example, the user can access the user control interface 30 through visiting a website known to provide such service, which can be hosted on the same domain as the propagation server 16. The user control interface 30 represents content delivered by (or, more generally, communications with) the propagation server 16 rather than a web server 12. In an implementation, the user control interface 30 can comprise a web browser settings interface separate to the web browser interface itself—for example, accessible via a menu of the web browser. In this case, the web browser settings interface undertakes data communications with the propagation server 16 in order to cause modifications to the propagation rules stored on the web browser.

In an embodiment, the user control interface 30 is automatically generated in an instance where a propagation cookie is created due to the web browser's interaction with the system 10, to enable the user to set their preferred rules to begin with. In an embodiment, the user control interface 30 is automatically generated in an instance where a new domain cookie (i.e. whether or not a propagation cookie already is present) is created due to the web browser's interaction with the system 10. Although the user control interface 30 can be presented to the user in each instance of a client device 11 communicating with the propagation server 16 or a web server 12 of the system 10, this may be undesirable due to having an adverse effect on the user's web browsing experience. In an embodiment, therefore, a relatively small and discrete initial popup (not shown) can be presented to the user requesting whether the user would like to edit their preferences (in effect, edit the propagation rules associated with their web browser). The user can then be enabled to interact with the initial popup such as to indicate an intention to edit the propagation rules, in which case, the user control interface 30 is presented to the user (e.g. via a suitable direction to the client device 11 to communicate with the propagation server 16). The user ignoring said initial popup can be interpreted as the user indicating that they do not intend to edit the user-set propagation rules—i.e. default user-set propagation rules will be associated with the user.

In an implementation, the user control interface 30 and/or initial popup include visual information 33 identifying an operator of the propagation server 16, which can beneficially enable the user to understand that the propagation server 16 is operated by an entity separate to the of the web servers 12.

At step 706, the rules module 18 applies the selected ruleset to determine a value for the domain cookie (DomainID) for communication to the relevant domain server 13 (e.g. as used by step 508 of FIG. 5B). Relevantly, the DomainID stored in the domain cookie can be different to the UserID. It should also be understood that, in an embodiment, the rules module 18 can determine to not set a DomainID if the ruleset results in this determination—that is, no domain cookie is generated as a result of the embodiment.

Figure 10:
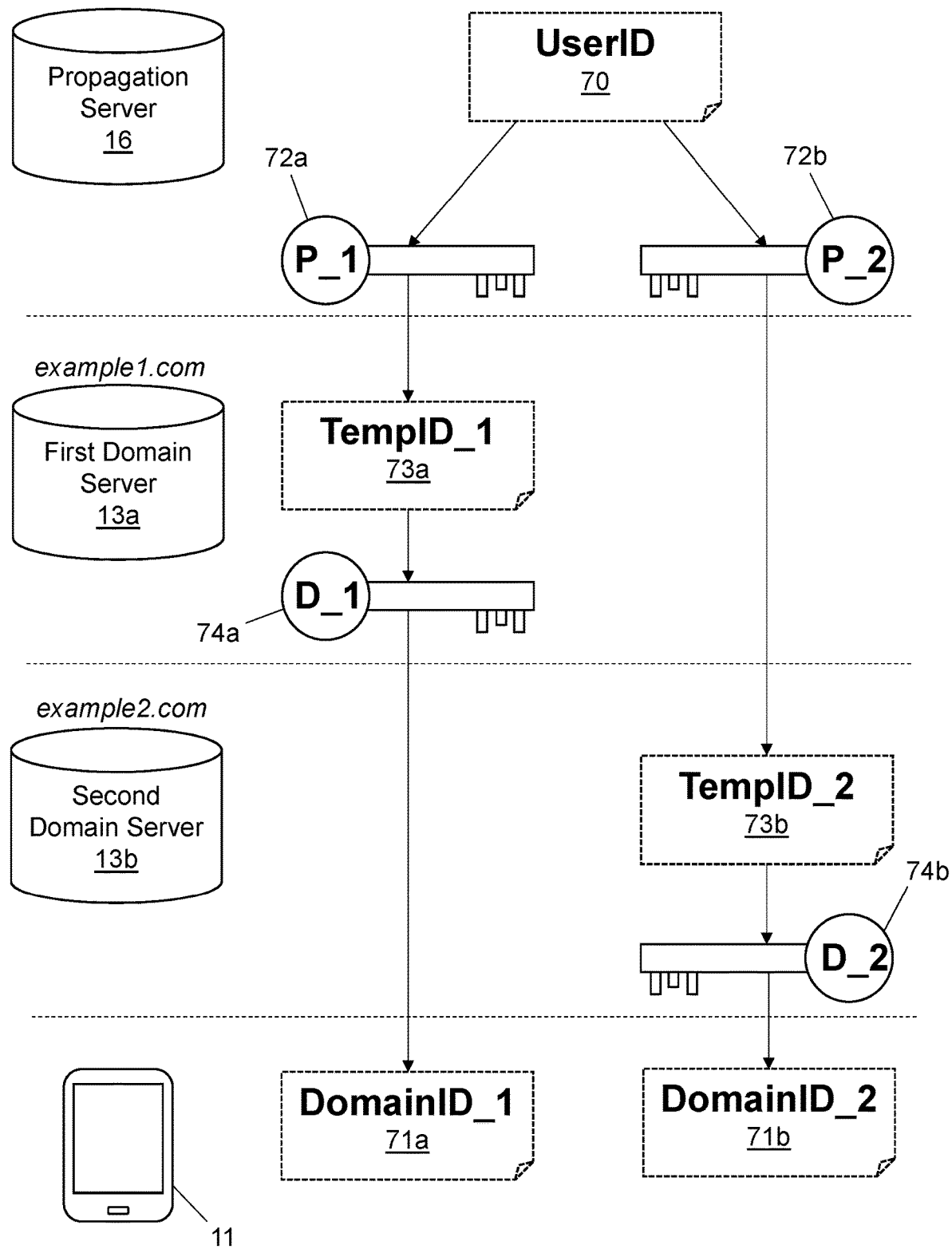
FIG. 10 shows a double encryption approach linking propagation cookies to domain cookies.

In an embodiment, with further reference to FIG. 10, a particular DomainID value (Domain ID 71a) is generated through at least twice encrypting the corresponding particular UserID 70. The propagation server 13 is arranged to store domain-specific "propagation keys" 72 for each domain. For example, a first propagation key 72a is stored in association with first domain example1.com and a second propagation key 72b is stored in association with second domain example2.com. It is assumed that the first propagation key is different to the second propagation key such that the same encryption algorithm applied to the UserID 70 will result in a different output when using the first propagation key to that when using the second propagation key.

According to this embodiment, the UserID 70 is first encrypted (using a predefined encryption algorithm) using the relevant propagation key. Generally, this is typically performed by the propagation server 13; for example, it can be preferred that it is not performed by the corresponding web server 12 of the domain, which is effected by not providing the propagation key to the web server 12. Therefore, a temporary ID value (TempID 73) is generated by the propagation server 13. The figure illustrates this relationship, showing first TempID 73a (due to a visit to a website of the first domain) as being generated by encrypting the common UserID 70 using the first propagation key 72a. Similarly, second TempID 73b (due to a visit to a website of the second domain) as being generated by encrypting the same UserID 70 but using the second propagation key 72b (which is assumed to be different to the first propagation key 72a). Therefore, the first TempID 73a is different to the second TempID 73b, and both are different to the UserID 70.

The resulting TempID 73 is then further encrypted using a domain-specific "domain key" 74. Advantageously, the domain keys 74 are not required to be stored on the propagation server 13. Therefore, in an embodiment, the operators of the relevant domains can set their respective domain keys 74 without requiring they domain keys 74 to be made known to the propagation server 13. Therefore, TempIDs 73 are encrypted using domain keys to generate the DomainIDs 71. Encryption is performed by the relevant domain server 13. A DomainID 71, once generated, is then stored on the client device 11 (i.e. encryption is performed before step 511).

FIG. 10 shows first DomainID 71 (due to a visit to a website of the first domain) being generated by encrypting the first TempID 73a using the first domain key 74a. Similarly, second DomainID 71b (due to a visit to a website of the second domain) is shown being generated by encrypting the second TempID 73b using the second propagation key 72b. Therefore, the first DomainID 71a is different to the second DomainID 73b, and both are different to each of the TempIDs 73 and to the UserID 70. The result of the methodology of FIG. 10 are a set of unique DomainIDs 71 which are related, via encryption techniques, to a common UserID 70.

An advantage of this embodiment may be that different DomainIDs 71 for the same client device 11 cannot be correlated without access to both the propagation keys and domain keys for the various associated domains. The propagation server 16 is enabled to determine the UserID 70 associated with a particular user (e.g. associated with a specific web browser or specific client device 11) and the TempIDs 73 for various domains but is not enabled to determine the DomainIDs 71 (as it does not hold the domain keys 74). Said another way, the propagation server 16 cannot, itself, determine a DomainID 71 from a supplied UserID 70 (or vice versa). The domain servers 13 are enabled to determine their respective DomainIDs 71 for a particular user (e.g. associated with a specific web browser or specific client device 11) and their respective TempIDs 73, but the domain servers 13 are not enabled to determine the common UserID (as the domain servers 13 do not hold the propagation keys 72).

Regarding the TempIDs 73, according to an embodiment, it is not required that these are stored permanently as both the propagation server 16 (via the propagation keys 72 applied to the UserID) and the domain servers 13 (via the domain keys 74 applied to the respective DomainIDs 71) can determine the TempIDs 73 on an as-needed basis. The TempIDs 73 therefore represent an interim encrypted value between the UserIDs 70 and the DomainIDs 71.

In a variation, the propagation keys 72 are stored on their associated domain servers 13 such that the domain servers 13 perform both encryption steps. Although this enables a particular domain server 13 to determine the common UserID 70 from an associated DomainID 71 of the same domain, domain servers 13 are still barred from determining DomainIDs 71 of other domain servers 13 (i.e. associated with different domains). For example, with reference to FIG. 10, the first domain server 31a can determine the UserID 70 from the first DomainID 71a but it cannot determine the second DomainID 71b.

In an implementation, the propagation rules are configured to identify domain(s) for which cookie propagation is allowed and domain(s) for which cookie propagation is not allowed. For example, user-set propagation rules may define certain domain(s) for which the user has agreed to allow cookie propagation and/or certain domain(s) for which the user has not agreed to allow cookie propagation.

A user of a client device 11 for which a propagation cookie has been generated can, in an embodiment, access a user control interface 30 (or other interface) associated with the particular propagation cookie in order to set specific domains as not allowed or allowed for propagation of the recorded information (e.g. UserID), which can be defined in the user-set propagation rules. Similarly, the user may be enabled to allow or disallow categories of domains (e.g. all sales domains, all news domains, etc.). The user control interface 30 can be provided as a web site associated with the propagation server 16 (either directly hosted on the propagation server 16 or via a separate web server (not shown)). For example, user control interface 30 includes a valid domains category which enables the user to select which domains of a particular group 20 the user allows the UserID to be propagated amongst. That is, although all domains of the group 20 are related commercially, the user is still empowered to control cross-domain use of the common UserID. Another example, the user control interface 30 includes a valid cross-domain category which enables the user to select which groups 20 can share information with one another (this may be limited to embodiments utilising a match module 17—discussed below with reference to FIGS. 11A and 11B).

Referring back to the groups 20 shown in FIG. 7A, in an embodiment, the rules module 18 is further configured to determine the domain cookie based on the particular domain being accessed by the client device 11. For example, the first group 20a can be associated with a first-group domain cookie and the second group 20b with a second-group domain cookie—the particular domain cookie generated therefore depends on the particular group 20. In this example, the domain cookie is set with the value of the first-group domain cookie if the client device 11 is communicating with web server 12a or 12b and with the value of the second-group domain cookie if the client device 11 is communicating with web server 12c or 12d.

This embodiment may be advantageous where the propagation server 16 and domain servers 13 are provided as part of a service by a service provider for a number of different entities (and therefore, groups 20). Accordingly, "cookies" (rather, the information therein contained) are propagated, in effect, only amongst domains of a particular group 20—thus, one entity is not provided with the cookie information (e.g. UserID or derived information such as DomainIDs) associated with another entity in a different group 20. This embodiment may also be advantageous when combined with user control (e.g. via a user control interface 30) of the user-specific ruleset, as the user is given control over a number of different groups 20 of related domains. For example, if a user selects a category of website to disallow propagation, this selection applies across many different entities. For example, if a user disallows propagation amongst "news websites", this could apply to the news websites of entity A and the news websites of entity B.

It is also expected that certain implementations will enable a user to agree to have a common domain cookie over two or more groups 20, although it is likely that such cross-group propagation will generally be disallowed by default.

The method of FIG. 7B may be suitable to be performed as part of step 313 or 314 of FIG. 3—that is, when determining the domain cookie to be set on the client device 11. This latter case requires separation between the value of the web page specific data (e.g. ETag) and the domain cookie, where the ETag may take the role of the propagation cookie.

In an embodiment, a previously set domain cookie for a particular domain is modifiable. For example, a user which previously allowed propagation to the particular domain may change to disallow use of the UserID derived information for that domain. Similarly, the user may decide to cancel or delete all reference to the UserID and DomainIDs—the cookies on the client device 11 should be updated to reflect this.

FIG. 7C shows a modification to the method of FIG. 5B—previously described and unchanged steps are as per the previous discussion herein. Modified steps are represented with a "A" suffix. Step 502 always proceeds to step 504—if a domain cookie is identified, then at step 505A, the information indicating the presence of the domain cookie is communicated to the propagation server 16. This can be effected by the propagation server communication instruction causing the client device 11 to communicate the information as part of the request, for example, the information can be passed in a URL or via a suitable network protocol. In an embodiment, the client device 11 communicates a flag indicating the presence of the domain cookie (for example, if the presence of the domain cookie is relevant but the actual content is not relevant for the propagation server 16 to determine to proceed to modified step 506A).

Modified step 506A checks whether the propagation cookie and domain cookie are present on the client device 11. However, the propagation server 16 undertakes a predefined action upon determining that the propagation cookie and the domain cookie are both not present. In an implementation, the absence of the propagation cookie is taken to mean the user no longer intends for the information to be available at all—effectively, that a "delete cookie" command should be propagated.

Therefore, at step 507A, the propagation server 16 generates a delete domain cookie instruction which is included within the domain server communication instruction (e.g. as executable code for execution by the web browser of the client device 11) communicated at step 508A, configured to cause the client device 11 to communicate to the original domain server 13 (i.e. in this example, the first domain server 13a). Alternatively, or in addition, the propagation server 16 can directly effect a redirect (e.g. via location headers in the response) to the first domain server 163. The domain server communication instruction includes an instruction, understandable by the domain server 13, to delete the domain cookie.

In response, the client device 11 then communicates a request to the first domain server 13a, at step 510. In response to the request, at step 511, the first domain server 13a is configured to respond, at step 511A, to the client device 11 with a delete cookie instruction to delete the domain cookie (or, in another implementation, to set it to a null or random value) based on the instruction included within the domain server communication instruction, thereby effectively removing the propagated information.

The response also includes a web server communication instruction (e.g. as executable code) for execution by the web browser of the client device 11 (e.g. in the form of JavaScript code), configured to cause the client device 11 to communicate to the original web server 12 (i.e. in this example, the first web server 12a). Alternatively, or in addition, the first domain server 13a can send a redirect instruction (e.g. via location headers in the response) to the first web server 12a.

The method then proceeds to web page rendering step 512. At this step, the first web server 12a communicates with the client device 11 (which may comprise multiple separate instances of communication), however, the generated content is not based on the information which had previously been stored in the first domain cookie.

Regarding FIG. 7C, it should be noted that in a case that both the propagation cookie and the domain cookie are present, the propagation server 16 can either proceed by effectively resetting the domain cookie and/or propagation cookie with their same values or by not sending cookie set commands.

The method can also be modified in relation to the case where the first domain cookie does exist. In this case, the propagation server 16 checks whether the first domain cookie comprises data consistent with a current propagation rules. If the first domain cookie information is inconsistent with the information of the propagation cookie (the comparison involving an application of the propagation rules), the propagation server 16 is configured to determine an update to the first domain cookie. For example, if the user has disallowed propagation for the associated domain, the propagation server 16 can communicate a delete cookie command to the web browser of the client device 11, thereby deleting the domain cookie. If the value for the domain cookie should be changed, this can also be communicated as a new set domain cookie (equivalent to overwrite) command.

The embodiments described with reference to FIGS. 7A-7C may advantageously provide for a balance between privacy, by allowing a user to choose domains to allow cookie propagation (or otherwise disallow and/or limit), and e-commerce functionality, by enabling content providers to provide tailored content based on consistently identifying a particular user.

Figure 11A:
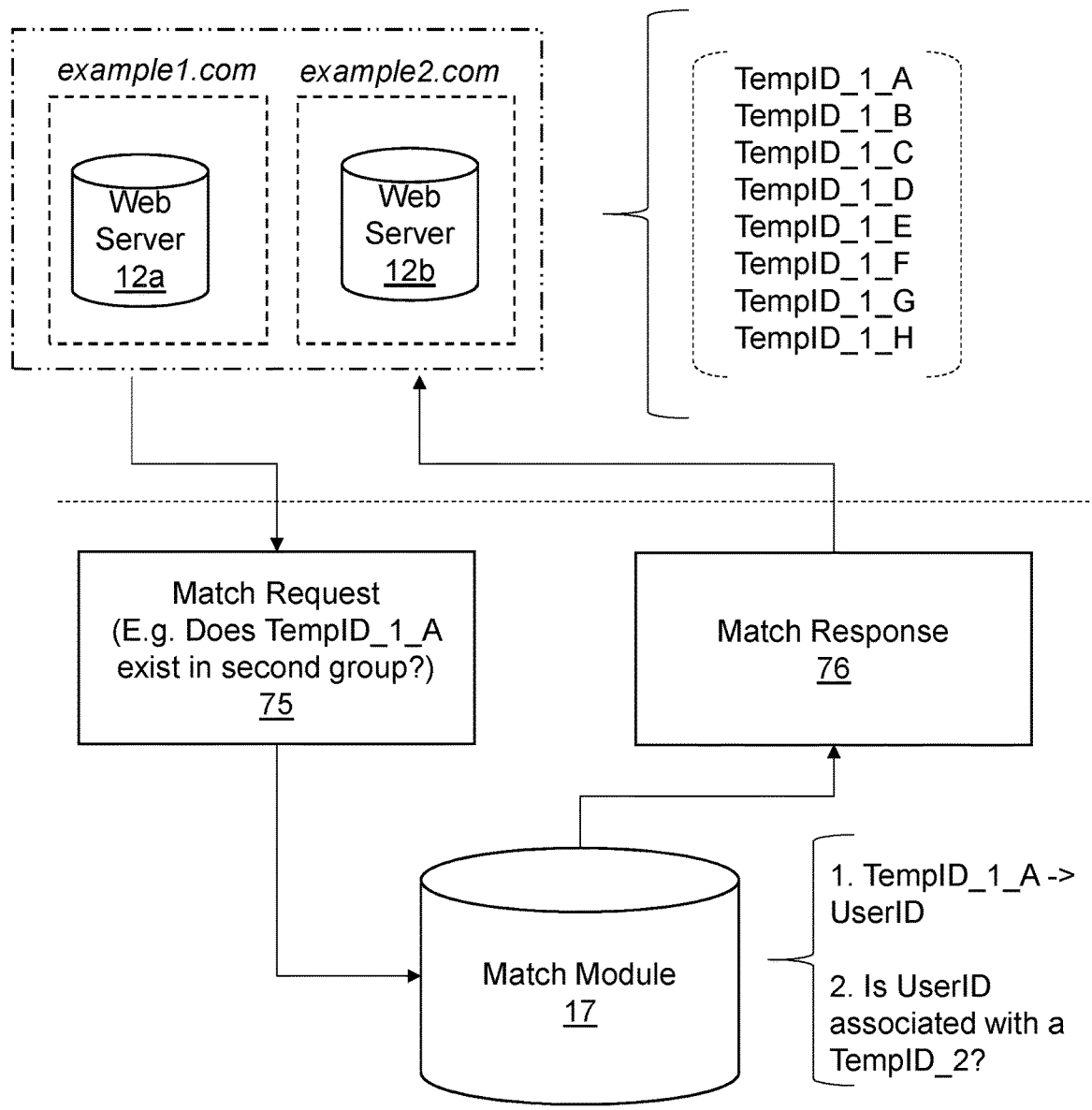
FIGS. 11A and 11B show operation of a match module according to embodiments.

FIG. 11A illustrates an embodiment comprising a match module 17 configured to enable limited information regarding a user to be made available between different groups 20. Relevantly, groups 20 are not provided with the DomainIDs of other groups 20—instead, the match module 17 facilitates the exchange of limited information. For example, the information may comprise simply a "yes/no" as to whether a first DomainID of a first group 20*a* (DomainID_1 in the figure) shares the same UserID as a second DomainID of a second group 20*b* (DomainID_2 in the figure). In effect, has the same user previously visited both groups. The information can comprise additional information, such as, which domains of a group 20 have been visited by the user. In an embodiment, the match module 17 is implemented by the propagation server 16. In another embodiment, the match module 17 is implemented by a match server (not shown). In either case, the match module 17 has access to the propagation keys known to the propagation server 16.

In an embodiment, the match module 17 receives a match request from the first group 20*a* (e.g. this may be a particular web server 12 of the first group 20*a*) identifying one or more known users to the first group 20*a*. In an embodiment, the request is effectively accompanied by the TempIDs for each user, as the users' DomainIDs are not made available to the match module 17 (as with the propagation server 16).

The match module 17 then obtains the TempIDs of the users known to the second group 20*b*. In one implementation, the propagation server 16 keeps a record of the TempIDs of each group 20, and therefore has already obtained the TempIDs of the second group 20*b*. In another implementation, the groups 20 regularly provide a listing of known TempIDs to the propagation server 16, which may have the benefit of allowing the groups 20 to control which users are made known to the match module 17. In yet another implementation, the TempIDs are communicated to the match module 17 on an as-needed basis—that is, in response to a request made by the match module 17.

In FIG. 11A, the TempIDs known to the second group 20*b* are represented by "TempID_2__A" to "TempID_2_H". Similarly, the TempIDs known to the first group 20*a* are represented by "TempID_1_A" to "TempID_1_H". The match request 75 is shown as being a request related to "TempID_1_A" of the first group 20*a* (which should be understood as an illustrative example.

The match module 17 then coverts the TempID received form the first group 20*a* into a first UserID. The match module 17 can maintain a record of UserIDs associated with TempIDs of the second group 20*b* or can convert as-needed. The match module 17 then identifies whether a TempID of the second group 20*b* corresponds to the TempID of the first group 20*a*, by identifying whether the first UserID is shared with a UserID of the second group 20*b* (whether a "match" exists or not). The match module 17*b* then issues a match response 76 to the first group 20*a* indicating that a match does or does not exist, as appropriate. The TempIDs of the second group 20*b* can also be accompanied by additional information, such as which specific domains have been visited by each TempID. In this case, the match module 17 can include in its response the additional information. In a variation, the original request is required to specify a particular one or more domains of the second group 20*b*, and only additional information related to these specified one or more domains is included in the request (where a match exists).

In an embodiment, the first group 20*a* can communicate one or more TempIDs to the match module 17 and all of these are compared to the obtained TempIDs of the second group 20*b*. One or both groups 20*a*, 20*b* can then be provided with match information for each of their TempIDs which were made available to the match module 17.

Figure 11B:
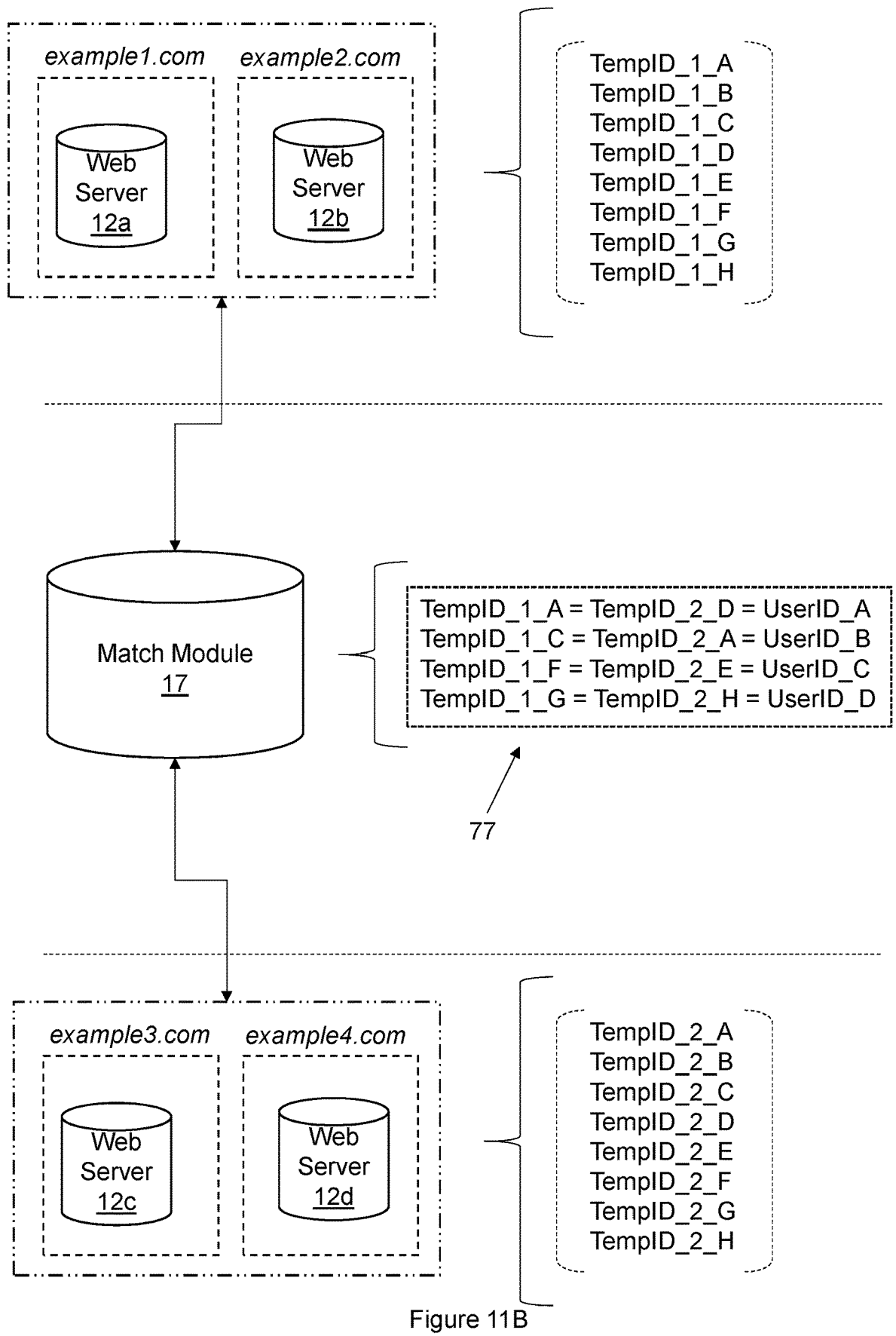

FIG. 11B illustrates an embodiment in which the various groups 20 (for illustrative purposes, a first group 20*a* and a second group 20*b* are shown) provide a listing of TempIDs to the match module 17 from time to time, for example, in response to a request issued by the match module 17 or periodically without a specific request. The match module 17 can then maintain a match database 77 indicating which TempIDs of the various groups 20 are associated with the same UserID. FIG. 11B shows an example of a subset of the TempIDs being recorded as matching within the match database 77, as it is not expected generally that the every DomainID of the first group 20 will have a corresponding DomainID in the second group 20*b* (e.g. because the corresponding user has not visited a domain in each group 20*a*, 20*b*). Advantageously, the embodiment of FIG. 11B can provide relatively fast responses to received match request 75.

In a variation, in response to a group 20 providing a listing of TempIDs, the match module 17 undertakes the disclosed matching procedure and responds immediately to the requesting group 20 with a listing of its TempIDs which are matched in one or more other groups 20—the particular one or more other groups 20 can be specified with the request. Therefore, the requesting group 20 is enabled to maintain its own database of matches to other groups 20. In a preferable implementation, the one or more other groups 20 are also provided with the results (e.g. which of their TempIDs are present in the requesting group 20).

The particular user's web browsers are not involved with the process of FIGS. 11A and 11B. In an embodiment, the users are enabled to specify whether they agree to cross-group sharing of information (which can be specified on a per group basis, for example, the user may allow sharing between some groups but not others)—this is stored as user-set match rules. As the users' web browsers are not involved with the match procedure, the user-set match rules cannot be stored in the users' user-set propagation rules (although a copy of the user-set rules can, of course, be stored on the user-set propagation rules). Instead, the user-set match rules are stored with the match module 17 to thereby allow access with data communication with the users' web browsers. The propagation server 16 can be configured, therefore, to set and update the user-set match rules as a result of user input, for example, when the user is modifying their propagation rules. Therefore, when deciding whether to report a match, the match module 17 applies the user-set match rules (if available) to determine whether a match can be reported, even when it exists.

It may be desirable to provide means to inform a web browser on a client device 11 that a particular redirect between web resources of different domains is trusted (e.g. the domains of the web servers (and domain servers) and the propagation domain). Similarly, it may be desirable to provide trust in relation to web page specific data (in particular, ETags) that may be associated with a different domain. In each case, the technique involved avoids certain privacy and security issues of third-party cookies, but may still be considered undesirable from a trust perspective.

In an embodiment, a trust signal is defined for which a web browser can be configured to identify. The trust signal should be data that is accessible by the web browser and that can be considered likely, if not certainly, to be controlled and originating from the same entity as controls the particular domain. For example, it can be desirable for the entity that a domain server 12 on a first domain redirecting to, or accessing web page specific data (e.g. ETag) associated with, the propagation domain or another second domain, be enabled to do so, as the entity trust the other domain on account of knowingly implemented a service utilising an embodiment herein described. A suitable trust signal can inform the web browser to allow the interaction with the other domain, even in a case where the web browser would otherwise block such an interaction. For example, certain web browsers have recently stopped providing ETag access across domains.

In the particular embodiment considered, the DNS of the domain of the domain server 12 (i.e. of the entity) is modified—in particular, a record (assumed here to be a TXT record) is entered identifying each trusted domain (for example, as a plaintext list). E.g. in a case of a first domain, second domain, third domain, and propagation domain, the TXT records of the DNS entries for the first domain, second domain, and third domain are modified to refer to each other domain (including the propagation domain).

The DNS TXT record can reliably be assumed to be controlled by the same entity which controls the domain, and can therefore be considered trusted. Additionally, the web browser will likely cache the DNS information during a session in which aa user is accessing the domain on a client device 11. Therefore, the records are available to the web browser (likely in a cache) and can therefore be easily checked.

Therefore, when web browser is instructed to redirect (JavaScript, location header, etc.) or access information of another domain, it compares the other domain with the DNS TXT record to determine if that domain is present. When the web browser stores ETags (cache), for example, it can use the same logic to partition cache based on those domains, so that the same resource is cached across the entire collection and information and cache can be shared. It is also envisaged that this DNS TXT record approach, can be used as "second-party cookie" or "network-cookie" signal, to allow server side cookies to be set for those domains. That is, in effect, a third-party cookie effect (access from other domains) but without the inherent privacy and security issues. This means that if e.g. example.com calls a resource from example1.com, then example1.com can set cookie within a browser that belongs to example1.com despite user being on example.com (i.e. this would normally mean third—party cookie).

Certain advantages of this approach may include one or more of: (1) only a domain owner can control the trust, meaning no JS, browser or anyone else can manipulate this information; (2) even if someone reads TXT records, they mean nothing to them; and (3) if a company adds or removes a domain from their network, changes can be propagated effectively immediately, no updates to websites or any other components are needed.

Figure 6:
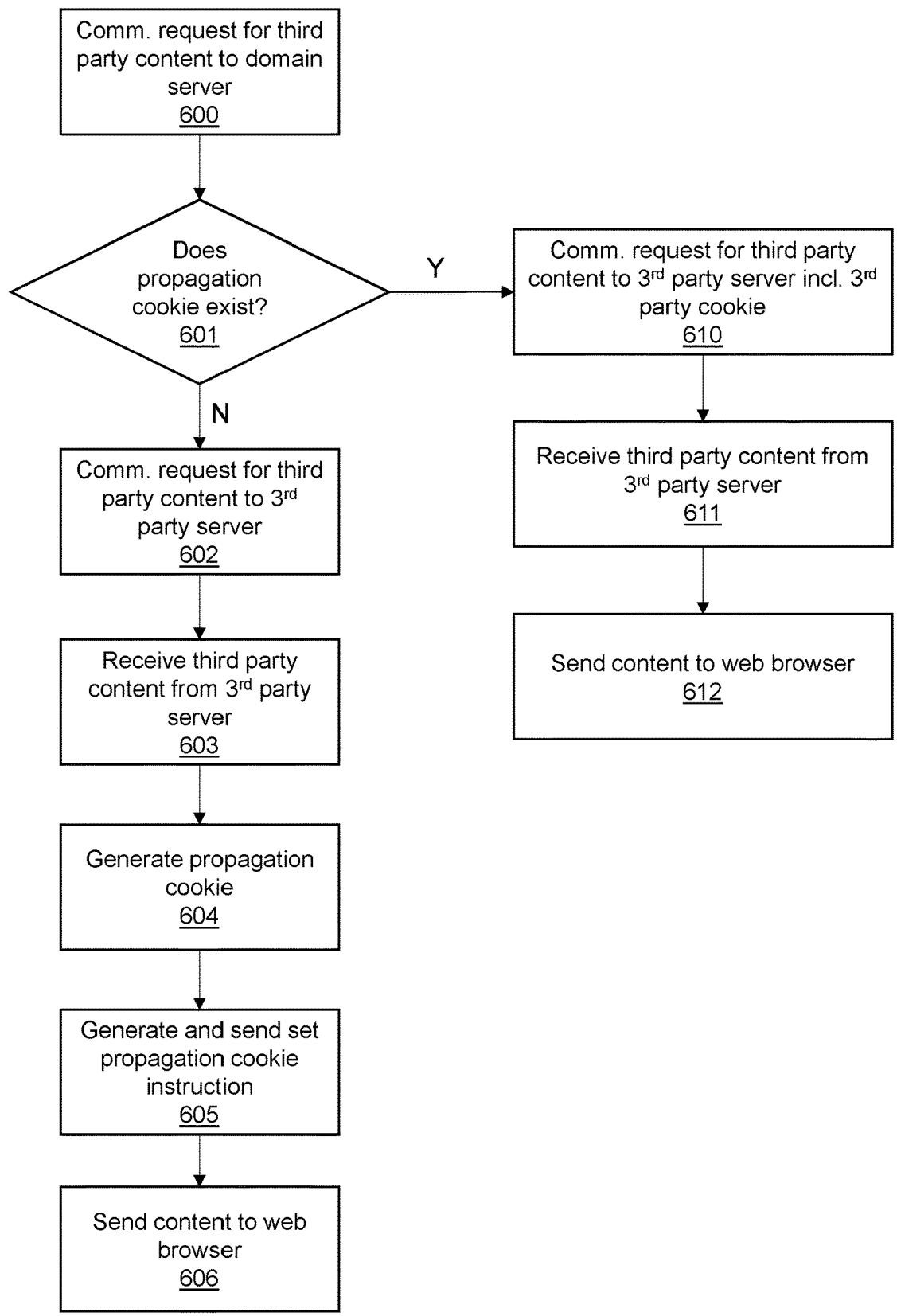
FIG. 6 shows a method for generating a domain cookie via a third-party content server.

According to an embodiment, with reference to FIG. 6, there is provided a method for utilising a cookie associated with a content server 14 (a "content cookie") to determine the value for a domain cookie. Similarly, the method describes using a domain cookie present on the client device 11 for determining a content cookie to communicate to the third-party server 14. This embodiment may advantageously enable a third-party content server 14 to continue to utilise third-party cookies while avoiding setting of such cookies on the client device 11.

In this case, the content server 14 is associated with a different domain to both a web server 12 and its associated domain server 13, and therefore, is barred from directly setting a cookie value on the web browser in response to the web browser accessing the web page of the web server 12 (or at least it is desired for the content server 14 to not set a third-party cookie).

Therefore, the domain server 13 effectively converts cookie values between those present on the client device 11 (domain cookies) and those utilised by the content server 14 (content cookies). The method of FIG. 6 can apply in the case of step 312 of FIG. 3—that is, there is no domain cookie associated with a second web page present. In effect, the domain server 13 converts between the content cookies (being, effectively, third-party cookies) of the content server 14 and first-party cookies set on the client device 11 (the domain cookies).

The content cookie can be associated with different functions. For example, the content cookie can enable tracking amongst different web pages or can provide for improved identify recognition.

According to this embodiment, the web browser communicates a request to the domain server 13 for information provided by the content server 14. The present embodiment thereby utilises the domain server 13 as a proxy for the content server 14. It should be understood that the embodiment described can be utilised using different proxy technologies. It should also be understood that the web content of the content sever 14 can be accessed directly; importantly, however, cookie-related information is passed through the domain server 13 between the client device 11 and the content server 14.

In a particular non-limiting example, the content server 14 can be configured to provide advertising content to the web browser to accompany the content provided by the web server 12. As according to known technologies, the advertising content is provided dynamically and, where available, at least in part based on identifying information associated with the web browser (or, more particularly, the user of the client device 11). In the prior art, this identifying information can be stored within a third-party cookie stored on the web browser—thus, no matter the particular domain being visited while web browsing, targeted advertising can be provided.

At step 600, the web browser communicates to the domain server 13 a request for content from the content server 14 (typically, the request will identify the content server 14 although in some cases the domain server 13 can automatically identify the content server 14). It should be understood that the request can be one that is only expected to return an instruction to set a content cookie associated with the content server 14, although it is generally expected that a response with content for display on the web browser is provided.

The domain server 13 then checks, at step 601, for the presence of a previous set domain cookie, set by the domain server 13 on behalf of the content server 14. Step 601 can comprise implementing the method of FIG. 3 (e.g. including execution of the first code on the web browser)—therefore, if a domain cookie has been set in association with another web page on a different domain, it is propagated to a domain cookie in relation to the present web page's domain and is therefore made available to the domain server 13 in relation to the current web page and is therefore determined as present. Of course, if the domain cookie is already present in relation to the current web page, it will also be determined as present.

If a domain cookie is not set (previously or via propagation), the domain server 13 then communicates a request to the third-party server 14 for the relevant third-party content, at step 602. The request is not accompanied by a content cookie for use by the content server 14—that is, the domain server 13 does not generate a content cookie based on an existing domain cookie. At step 603, the content server 14 returns (either to the domain server 13 or directly to the web browser of the client device 11) the content. Additionally, the response of the content server 14 includes an instruction to set a content cookie comprising some data. In the advertising content example, the content server 14 can generate a new identifier to accompany content cookie for identifying the client device 11.

At step 604, the domain server 13 generates a domain cookie based on the value of the content cookie set by the content server 14. For example, the domain cookie can be generated according to an encryption algorithm or hashing algorithm applied to the data of the content cookie. The domain cookie can be considered a converted "third-party" cookie, in that the content cookie is associated with a different domain to the domain cookie (and, in addition, the domain of the web server 12). At step 605, the domain server 13 generates and sends an instruction for the web browser of the client device 11 to set the domain cookie (e.g. with an attribute such that the processing server cookie is available to executable code, e.g. by not setting HttpOnly). At step 606 (which typically occurs simultaneously with step 605), the content is communicated from the domain server 13 to the client device 11.

As a result of step 605, a domain cookie has been set on the client device 11 recording information derived from that set by the content server 14 in the content cookie. However, the domain cookie, as discussed, is a first-party cookie. The domain cookie can be propagated in the future as according to, for example, the method of FIG. 3 and is therefore available when the client device 11 visits other related web pages, associated with different domains.

Referring back to step 601, if a domain cookie is set, the domain server 13 then communicates a request to the content server 14 for the relevant content provided by said server 14, at step 610. The request is accompanied by the content of, or derived from, the domain cookie, for use by the content server 14—that is, the domain server 13 communicates a cookie (or said information) based on the domain cookie. At step 611, the content server 14 returns (either to the processing server 13 or directly to the web browser of the client device 11) the content. The content server 14 is not required to generate a new content cookie. Typically, the content is generated at least in part based on the cookie information (derived from the domain cookie) communicated to the content server 14 (e.g. targeted advertising). This content is then communicated to the web browser of the client device 11, for example, via the domain server 13 acting as a proxy, at step 612.

Advantageously, the methods of FIGS. 3 and 6 can operate together to enable an effect similar to that provided by third-party cookies while only setting first-party cookies on the client device 11. That is, a plurality of first-party domain cookies can record the same information derived from the content cookie, each associated with a particular domain. Each domain cookie can then be utilised to generate cookie information for communicating to the content server 14. From the perspective of the content server 14, the same value is received despite the particular web resource being accessed by the web browser of the client device 11, and therefore, the web browser (or the particular user combined with the particular web browser) can be identified—the content server 14 does not require modification in order to provide content and cookies to the client device 11 as the conversion between third-party cookies and first-party cookies is handled by the domain server 13.

In a variation, in relation to the method of FIG. 5B, the propagation server 16 can take the role of the domain server 13 by transcribing between the content cookie from the content server 14 and the domain cookies for each web page domain.

In an embodiment, it is desirable to set an auxiliary cookie for at least one domain cookie. Each auxiliary cookie can record the same information as its associated the domain cookie, or at least, information derivable from the domain cookie (or from which the domain cookie is derived). In effect, each auxiliary cookie set will comprise representations of the same information, although, typically, the domain cookie is a modified version of the auxiliary cookie, or vice versa. Each auxiliary cookie is set with an attribute barring access by executable code executed on the web browser—that is, for example, the HttpOnly attribute can be set. Such an embodiment can provide an advantage as the domain cookies set due to interactions with the third-party content server 14 can be set without the HttpOnly attribute—thus, the domain cookie is readable by executable code such as JavaScript but the auxiliary cookies are not.

According to an embodiment, each time a domain cookie is set, an auxiliary cookie is also set. However, instead of reading the value of a domain cookie for generating a communication of information to the content server 14, the associated auxiliary cookie is accessed.

In an embodiment, the auxiliary cookie is equal in value to a content cookie, and the domain cookie is an anonymised equivalent of the content cookie. This embodiment can be useful where it is preferred to set a cookie which is not accessible to executable code (e.g. with HttpOnly set) which can comprise non-encrypted information (e.g. in plaintext)—this is, the auxiliary cookie performs a similar function to third-party cookies when set in the prior art. However, the domain cookie is anonymised using an encryption function—therefore, there is lower risk in setting it as accessible to executable code (e.g. without HttpOnly set) as the data contained is not easily readable. The auxiliary cookie can have the effect of being a conversion of the content cookie into a first-party cookie—it appears to have exactly the same content, it is simply set by the domain of the web page rather than a different domain.

Embodiments described herein can be utilised for a variety of implementations. An example previously discussed is for advertising tracking. Another example is user identification for website access purposes. In the prior art, a third-party cookie can be utilised to identify a particular web browser as known for different websites hosted on different domains—in this way, a particular user can avoid identifying themselves each time they visit one of these websites. The embodiments described herein can be utilised to provide the same effect as the third-party cookie while only setting first-party cookies on the client device.

Generally, many situations in which third-party cookies are used in the prior art to provide for websites on different domains to access the same cookie data, certain embodiments may be suitable for providing a similar effect while only setting first-party cookies on the client device 11.

Figure 8A:
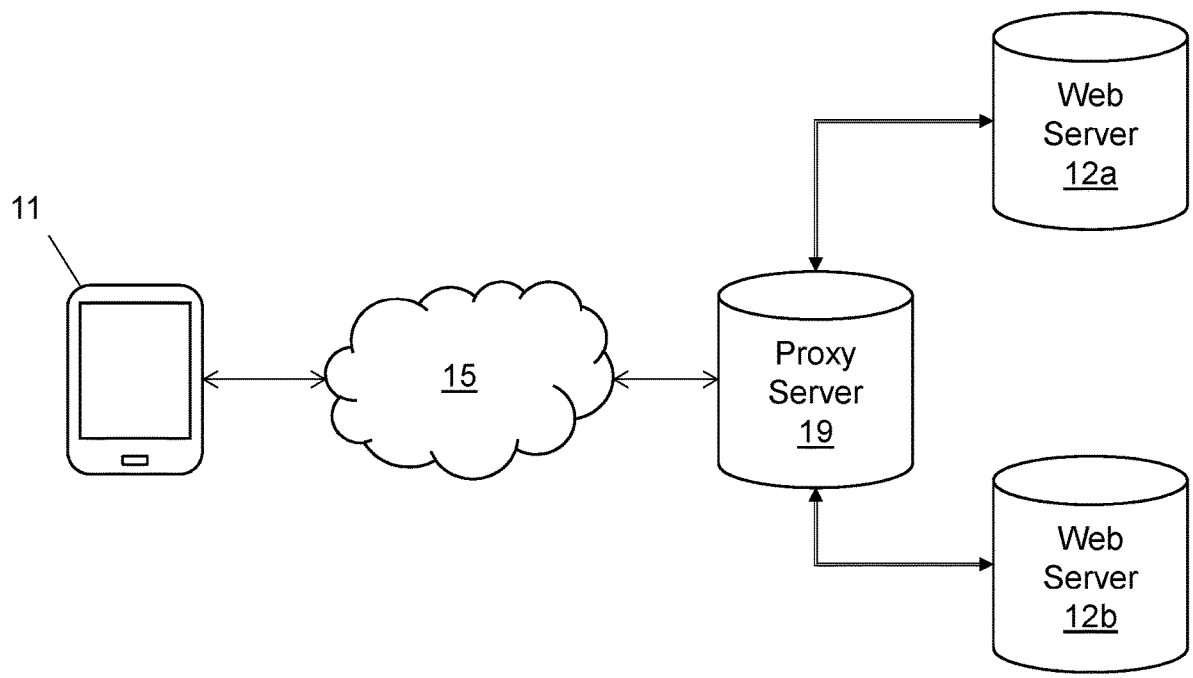
FIGS. 8A-8E relate to using a proxy server to modify communications to a third-party resource.
Figure 8B:
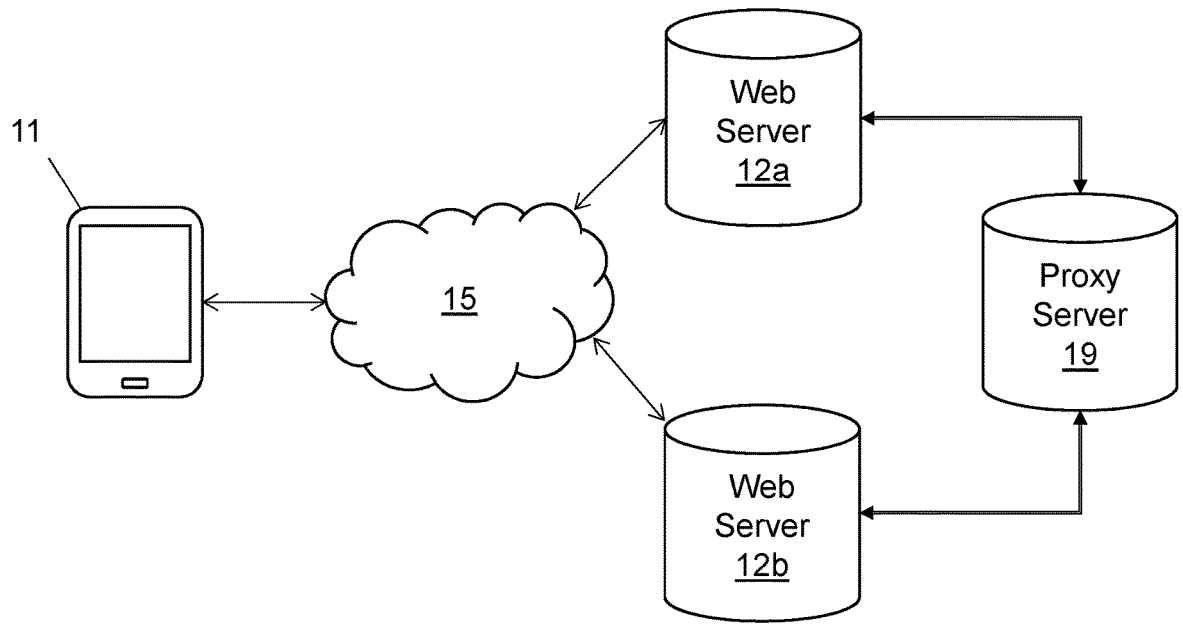
Figure 8C:
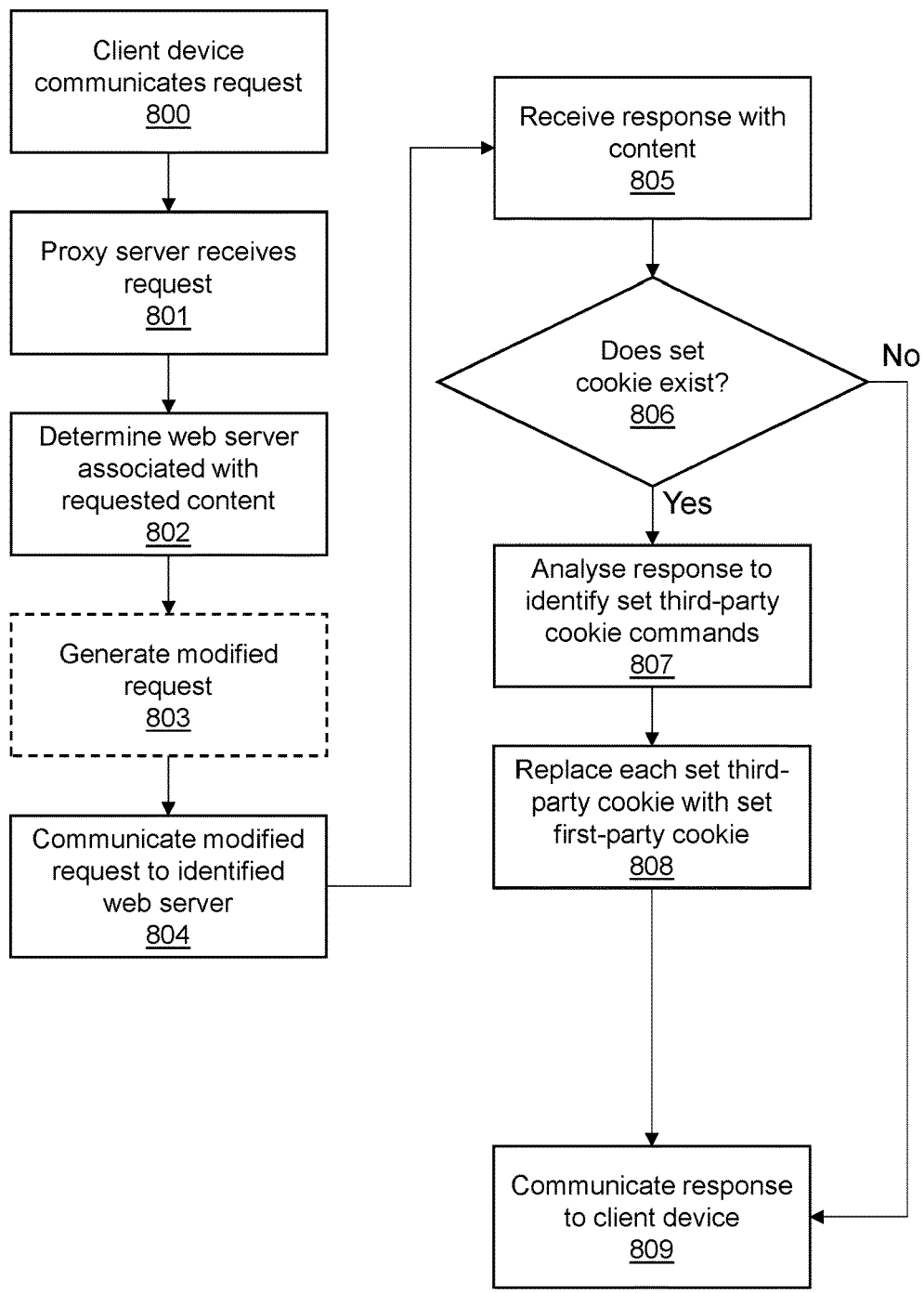
Figure 8D:
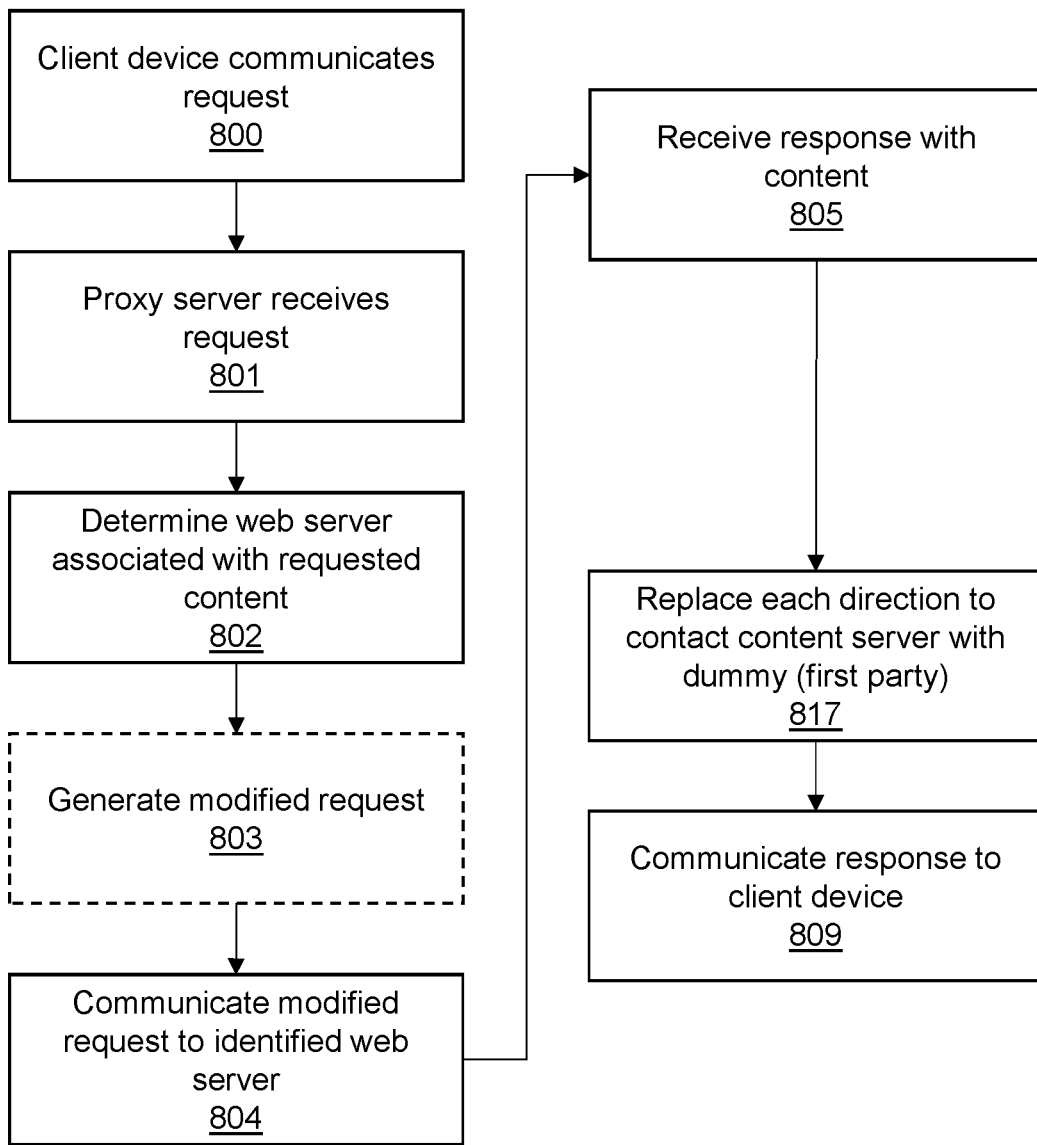

FIGS. 8A and 8B show topologies for implementing an embodiment shown in FIG. 8C and FIG. 8D, in which proxy server 19 is configured to intercept requests directed towards different web servers 12a, 12b from the client device 11. The web servers 12a, 12b are associated with different domains (e.g. first domain for first web server 12a and second domain for second webs server 12b) such that first-party cookies for one domain are not readable by the web server 12 of the other domain, etc. Proxy server 19 can be a logical function of the proxy server 19 or a domain server 13 or can be implemented as a different physical or logical server.

This can be effected in different ways, for example, with reference to FIG. 8A, the proxy server 19 may be associated with the domains of the web servers 12 via suitably configured DNS records, and the proxy server 19 is configured to communicate directly with the web servers 12 (for example, via network 15 or implemented as different logical functions within the same physical hardware or in direct data communication separate to the network 15). The proxy server 19 is configured to identify the appropriate web server 12 for a particular received request based on content of, or associated with, the request.

In another example, as shown in FIG. 8B, the requests are received by the relevant web servers 12, which are then configured to forward the request to the proxy server 19 (for example, via network 15 or implemented as different logical functions within the same physical hardware or in direct data communication separate to the network 15), said requests being modified and returned to the relevant web server 12. Similarly, responses by the web servers 12 are first forwarded to the proxy server 19, which can modify the responses and return to the web server 12, which then communicates the modified responses to the client device 11.

In either example, the proxy server 19 is configured to modify, in certain cases, communications from the client device 11 intended for the relevant web server 12 and, in certain cases, communications from the web servers 12 intended for the client device 11.

Relevantly, the web servers 12 are configured to communicate set cookie commands for setting third-party cookies. The embodiments of FIGS. 8A-8C are configured to modify said commands such as to cause setting of first-party cookies while retaining the information intended for the third-party cookies.

At step 800, the client device 11 communicates a request for content (e.g. via a web page request), which is received by the proxy server 19, at step 801. The request is associated with the first domain (e.g. www.example.com). The request typically will specify a particular web page for which content is desired—it should be noted that a default web page can be selected (e.g. http://www.example.com/index-.html). Relevantly, the content which is requested is, at least in part, stored and/or generated by the first web server 12a. At step 802, the proxy server 19 identifies the intended web server 12 for the request (for this example, assumed to be the first web server 12a).

Optionally, at step 803, the proxy server 19 generates a modified request based on the received request. The modified request comprises the information of the received request or information derived from said request such as to enable the web server 12 to provide the requested content. Said information can include some or all information of a header of said request. In an embodiment, step 803 comprises copying header and body information of the request when generating the modified request. The modified request may include information such that, when a response is received from the web server 12, it is enabled to identify the original client device 11.

At step 804, the proxy server 19 then communicates the modified request to the first web server 12; that is, the web server 12a identified at step 802. Relevantly, the modified request identifies the proxy server 19 for receiving a response to the modified request, the response generated by, and received from, the first web server 12a. That is, from the perspective of the first web server 12a, the modified request originates from the proxy server 19.

At step 805, the proxy server 19 receives a response generated by the first web server 12a. The response, for the purposes of exemplifying the method, comprises one or more "set cookie" commands, which are instructions to the web browser of the user device 11 to set a cookie.

The proxy server 19 is configured to analyse the received response in order to determine, at step 806, if one or more set cookie commands are present associated with a domain different to the first domain—any such domains are termed "third-party domains". If one or more said commands are present, the method proceeds to step 807. Otherwise, the method proceeds to step 808.

In the event that one or more set cookie commands are present, the proxy server 19 is configured to replace reference to the, or each, third-party domain with a new reference to the first domain, at step 807. The proxy server 19 is typically configured to parse the response in order to identify and replace references to third-party domains with the domain of the first web server 12a, thereby creating a first-party cookie. The content of the first-party cookie can be the same as the third-party cookie.

The response, as processed, is then communicated to the web browser of the client device, at step 808.

FIG. 8D relates to an embodiment which may be optionally implemented with that of FIG. 8C. Steps 800-804 are equivalent to those of FIG. 8C.

As with FIG. 8C, at step 805, the proxy server 19 receives a response generated by the first web server 12a. The response, for the purposes of exemplifying the present method, comprises executable code (e.g. JavaScript) comprising instructions for the web browser of the client device 11 to undertake one or more instances of communication with one or more content servers 14 (one is assumed here)—herein, content server communication instruction(s). The response also typically comprises content intended for rendering by the receiving web browser and/or executable code for execution by the web browser (e.g. JavaScript).

The proxy server 19 is configured to analyse the received response in order to identify, at step 816, the one or more instances of third-party server communication instruction(s) (e.g. by parsing the response)—that is, instructions to contact another web server 12 such as second web server 12b.

At step 817, the proxy server 19 is configured to replace reference to the particular web resource of the, or each, third-party server communication instruction with a reference to a dummy web resource, in which the domain of the first web server 12a is utilised such that the proxy server 19 receives communications directed towards the dummy web resources. The response, as processed, is then communicated to the web browser of the client device, at step 809.

In an embodiment, the proxy server 19 maintains, in a memory, a mapping database in which a mapping record is maintained between generated dummy web resources and the original web resource (i.e. the target of the associated content server communication instruction).

Figure 8E:
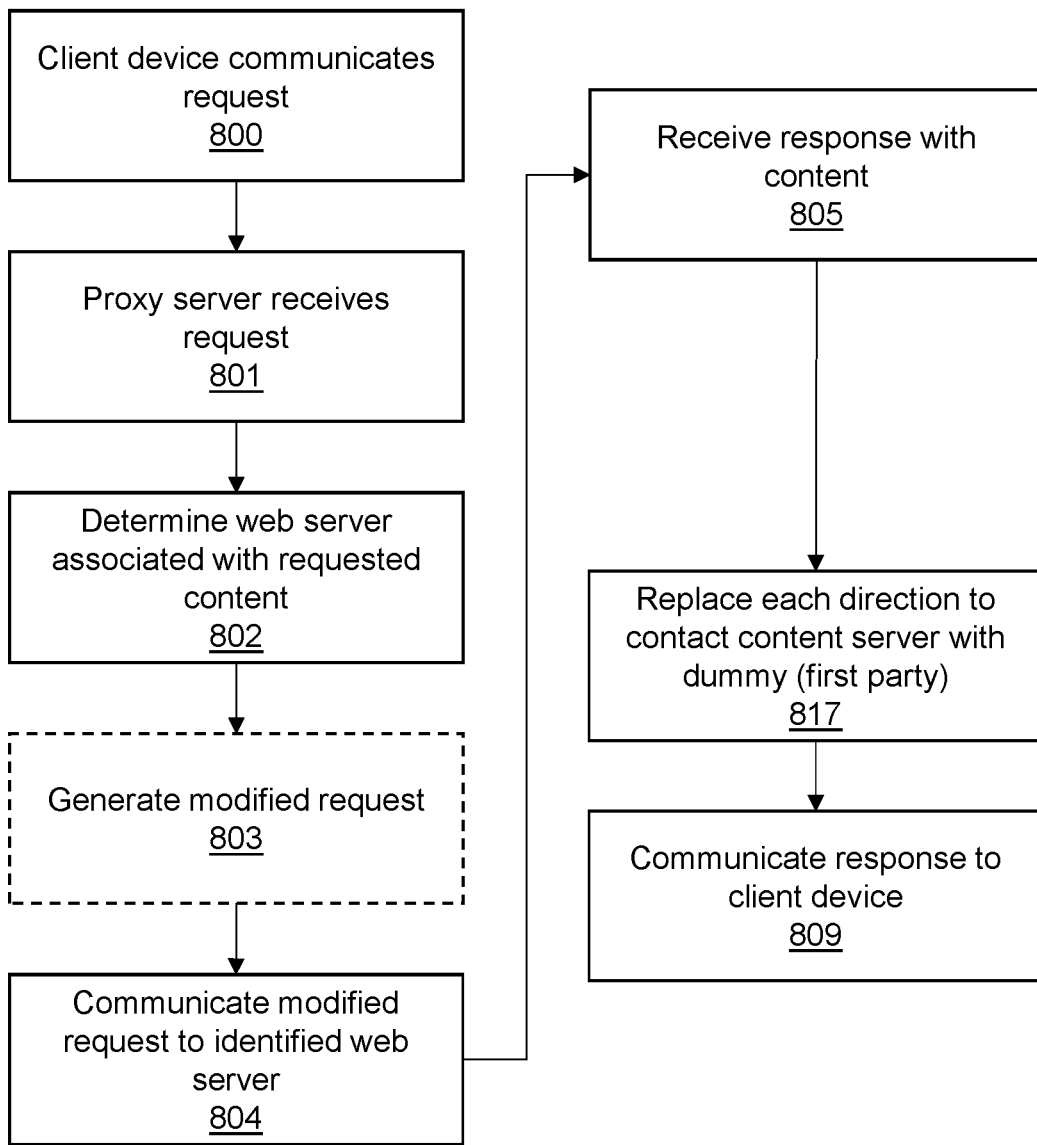

FIG. 8E (which includes steps of FIG. 8D) describes a process whereby the client device 11, upon receiving the executable code of FIG. 8D, communicates with the proxy server 19 via the dummy web resource(s), at step 820. The proxy server 19 compares the dummy web resource(s) to its mapping database to identify the actual third-party web resource (e.g. at the second web server 12*b*), at step 821. At step 822, the proxy server 19 determines if there are any cookie on the client device 11 associated with the dummy web resource (and therefore recorded as a first-party cookie of the first domain). Any such cookies are communicated to the third-party web resource (e.g. second web server 12*b*) along with a request for content as according to the mapped resource. Assuming a response is received, the content thereof is passed to the client device 11 and, if necessary, the steps of FIGS. 8C and 8D are repeated on this returned content.

In this way, the proxy server 19 can advantageously hide the third-party web resource from the client device 11, while still enabling content to be delivered from the third-party web resource to the client device 11.

The disclosure herein has focused, for the most part, of storing information in first-party cookies. An advantage of cookies over other mechanisms for storing information in a web browser is that cookie data is provided to a server (e.g. web server 12, domain server 13, and propagation server 16) as part of a normal HTTP GET request—that is, cookies provide their data to the server without requiring a specific request for the data to be made by the server. However, in principle, at least some of the first-party information herein can be stored in other data structures, such as web browser local storage or a database such as IndexedDB, where these data structures are also, effectively, "first-party" in that the content is not accessible by servers on other domains. Therefore, the techniques described herein in relation to first-party cookies should be understandable as applicable, if appropriate, more generally to "first-party" data structures. In one possible example, some or all user-set propagation rules are stored in an IndexedDB while the UserUD is stored in a propagation cookie, thereby making the UserID immediately available to a propagation server 16 while allowing a subsequent request to be made for the propagation rules, if deemed necessary by the propagation server 16.

Further modifications can be made without departing from the spirit and scope of the specification.

The invention claimed is:

1. A propagation server for facilitating propagation of recorded information between first-party data structures associated with different domains, the propagation server arranged for data communication via a network with web browsers of client devices, wherein the propagation server is associated with a propagation domain being a web domain, wherein the propagation server is configured to:

receive a first request from a first web browser, said first web browser associated with a first client device, wherein the first request identifies a first domain being a web domain different to the propagation domain;

determine, via data communication with the first web browser, whether a propagation data structure, being a first party data structure associated with the propagation domain, is present on the first web browser;

in a case where the propagation data structure is present:

determine an identifier from information stored with the propagation data structure;

generate first propagation information in dependence on the identifier, said first propagation information enabling determination of the identifier by the propagation server in a subsequent data communication instance between the first web browser and the propagation server, wherein said subsequent data communication instance is identified as being associated with the first domain; and communicate the first propagation information to the first web browser.

2. The propagation server of claim 1, wherein the propagation server is configured to:

in a case where the propagation data structure is not present:

generate an identifier;

generate the first propagation information in dependence on the generated identifier, said first propagation information enabling determination of the generated identifier by the propagation server in a subsequent data communication instance between the first web browser and the propagation server, wherein said subsequent data communication instance is identified as being associated with the first domain; and communicate the first propagation information to the first web browser.

3. The propagation server of claim 2, wherein the propagation server is configured to:

in response to determining that a propagation data structure is not present, cause a presentation of a user control interface on the first web browser enabling a user of the first web browser to define one or more propagation rules for storing in a propagation rules data structure on the first web browser, wherein the one or more propagation rules are not accessible to data communications from domains different to the propagation domain, and wherein the propagation information is generated in dependence on the defined one or more propagation rules.

4. The propagation server of claim 1, wherein the propagation server is configured to:

receive a propagation rules edit request from the first web browser;

in response, cause a presentation of a configuration interface on the first web browser enabling a user of the first web browser to at least one of define or modify one or more propagation rules for storing in a propagation rules data structure on the first web browser, wherein the one or more propagation rules are not accessible to data communications from domains different to the propagation domain, and wherein the propagation information is generated in dependence on the defined one or more propagation rules.

5. The propagation server of claim 1, wherein the propagation information is also generated in dependence on one or more propagation rules associated with the propagation data structure.

6. The propagation server of claim 5, wherein the one or more propagation rules define at least two groups of one or more domains, wherein each group comprises different domains to the other groups, such that the propagation information generated in dependence on a particular identifier is the same for domains of a group and different for domains of different groups.

7. The propagation server of claim 6, further interfaced with a match module arranged for data communication via the network, the match module configured to:
receive a first request associated with a first group of the at least two groups, wherein the request identifies one or more first identifiers and specifies at least one second group of the at least two groups, the at least one second group being different to the first group;
obtain second propagation information associated with one or more web browsers from the second group, and convert the second propagation information into one or more second identifiers, each associated with one of the one or more web browsers;
identify, for each of the one or more first identifiers, a match state indicative of the presence or non-presence of an identical second identifier; and
communicating a response to the first group indicating the match state for each of the one or more first identifiers.

8. The propagation server of claim 7, wherein the match module is implemented by the propagation server.

9. The propagation server of claim 7, wherein the first request provides first propagation information associated with one or more web browsers and the match module converts said first propagation information into the one or more first identifiers, thereby identifying the one or more first identifiers.

10. The propagation server of claim 7, wherein the match module maintains a record of match rules for a plurality of identifiers, and the identified match state for at least one first identifier is dependent on an allowability rule defined the match rule for that at least one identifier.

11. The propagation server of claim 1, wherein the propagation server encrypts the identifier to thereby generate an encrypted identifier for storing with the propagation data structure, and decrypts the encrypted identifier when determining the identifier.

12. The propagation server of claim 1, wherein the propagation server maintains a database of propagation keys, each propagation key associated with one or more domains, and wherein generation of the propagation information comprises encrypting the identifier utilising a first propagation key being associated with the first domain.

13. A network system comprising:
a propagation server for facilitating propagation of recorded information between first-party data structures associated with different domains, the propagation server arranged for data communication via a network with web browsers of client devices, wherein the propagation server is associated with a propagation domain being a web domain, wherein the propagation server is configured to:
receive a first request from a first web browser, said first web browser associated with a first client device, wherein the first request identifies a first domain being a web domain different to the propagation domain;
determine, via data communication with the first web browser, whether a propagation data structure, being a first party data structure associated with the propagation domain, is present on the first web browser;
in a case where the propagation data structure is present:
determine an identifier from information stored with the propagation data structure;
generate first propagation information in dependence on the identifier, said first propagation information enabling determination of the identifier by the propagation server in a subsequent data communication instance between the first web browser and the propagation server, wherein said subsequent data communication instance is identified as being associated with the first domain; and
communicate the first propagation information to the first web browser; and
one or more domain servers, each arranged for data communication via a network with the web browsers of the client devices and each associated with a unique domain, wherein the propagation domain is different to the unique domains of the one or more domain servers, and wherein each domain server is configured to:
receive a communication from a web browser;
determine whether a first domain data structure is associated the communication, the first domain data structure associated with the domain of the domain server;
in response to determining that there is not a first data structure present, obtain from the web browser propagation information, the propagation information having been obtained by the web browser due to the first request communicated to the propagation server;
generate first domain data structure information based on the received propagation information; and
instruct the web browser to record in a new first domain data structure the first domain data structure information.

14. The network system of claim 13, wherein the first domain data structure information by encrypting the propagation information utilising a first domain key known to the domain server, the first domain key not utilised in generating the propagation information from the identifier.

15. The network system of claim 14, wherein the propagation server encrypts the identifier to thereby generate an encrypted identifier for storing with the propagation data structure, and decrypts the encrypted identifier when determining the identifier, and wherein each domain server is configured to generated associated domain data structure information by encrypting received propagation information utilising a domain key known to the particular domain server.

16. The network system of claim 15, wherein each domain server is configured to:
receive the propagation information from the web browser after the web browser is instructed to communicate with the propagation server, said propagation information provided to the web browser due to its communication with the propagation server.

17. A propagation server for facilitating propagation of recorded information between first-party data structures associated with different domains,
the propagation server arranged for data communication via a network with web browsers of client devices, wherein the propagation server is associated with a propagation domain being a web domain, wherein the propagation server is configured to:
receive a first request from a first web browser, said first web browser associated with a first client device, wherein the first request identifies a first domain being a web domain different to the propagation domain;
determine, via data communication with the first web browser, whether a propagation data structure, being a first party data structure associated with the propagation domain, is present on the first web browser;

in a case where the propagation data structure is not present:

generate an identifier;

generate the first propagation information in dependence on the generated identifier, said first propagation information enabling determination of the generated identifier by the propagation server in a subsequent data communication instance between the first web browser and the propagation server, wherein said subsequent data communication instance is identified as being associated with the first domain; and communicate the first propagation information to the first web browser.

18. The propagation server of claim 1, wherein the propagation data structure comprises a propagation cookie in which at least the information for determining the identifier is stored.

19. The propagation server of claim 17, wherein the propagation data structure comprises a propagation cookie in which at least the information for determining the identifier is stored.

20. A method for facilitating propagation of recorded information between first-party data structures associated with different domains, the method comprising:

at a propagation server arranged for data communication via a network with web browsers of client devices, wherein the propagation server is associated with a propagation domain being a web domain:

receiving a first request from a first web browser, said first web browser associated with a first client device, wherein the first request identifies a first domain being a web domain different to the propagation domain;

determining, via data communication with the first web browser, that a propagation data structure, being a first party data structure associated with the propagation domain, is present on the first web browser;

in response, determining an identifier from information stored with the propagation data structure;

generating first propagation information in dependence on the identifier, said first propagation information enabling determination of the identifier by the propagation server in a subsequent data communication instance between the first web browser and the propagation server, wherein said subsequent data communication instance is identified as being associated with the first domain; and communicating the first propagation information to the first web browser.

21. A method for facilitating propagation of recorded information between first-party data structures associated with different domains, the method comprising:

at a propagation server arranged for data communication via a network with web browsers of client devices, wherein the propagation server is associated with a propagation domain being a web domain:

receiving a first request from a first web browser, said first web browser associated with a first client device, wherein the first request identifies a first domain being a web domain different to the propagation domain;

determining, via data communication with the first web browser, that a propagation data structure, being a first party data structure associated with the propagation domain, is present on the first web browser, is not present;

in response, generating an identifier;

generating the first propagation information in dependence on the generated identifier, said first propagation information enabling determination of the generated identifier by the propagation server in a subsequent data communication instance between the first web browser and the propagation server, wherein said subsequent data communication instance is identified as being associated with the first domain; and communicating the first propagation information to the first web browser.

* * * * *